United States Patent
Lohr et al.

(10) Patent No.: US 8,015,886 B2
(45) Date of Patent: Sep. 13, 2011

(54) TORQUE MEASUREMENT WITHIN A POWERTRAIN

(75) Inventors: Raymond David Lohr, Bucks (GB); Victor Alexandrovich Kallnin, Headington (GB); John Peter Beckley, Kidlington (GB); Arthur John Leigh, Banbury (GB); George Edward Andrew Bown, Buckingham (GB); David Daniel George Vile, Bicesler (GB)

(73) Assignee: Transense Technologies PLC, Bicester, Oxon (GB)

( * ) Notice: Subject to any disclaimer, the term of this patent is extended or adjusted under 35 U.S.C. 154(b) by 253 days.

(21) Appl. No.: 12/489,575

(22) Filed: Jun. 23, 2009

(65) Prior Publication Data

US 2009/0314104 A1 Dec. 24, 2009

Related U.S. Application Data

(63) Continuation-in-part of application No. 11/939,242, filed on Nov. 13, 2007, now Pat. No. 7,770,471, which is a continuation-in-part of application No. PCT/GB2005/003118, filed on Aug. 8, 2005.

(30) Foreign Application Priority Data

| Aug. 16, 2004 | (GB) | ................................. 0418271.3 |
| Mar. 15, 2006 | (GB) | ................................. 0605240.1 |
| Mar. 9, 2007  | (WO) | ................ PCT/GB2007/000824 |

(51) Int. Cl.
    *G01L 1/22* (2006.01)
(52) U.S. Cl. .............................. 73/862.338; 73/862.326
(58) Field of Classification Search .................. 73/862.331–862.335
See application file for complete search history.

(56) References Cited

U.S. PATENT DOCUMENTS

| 4,135,390 A | 1/1979 | Templin |
| 5,975,136 A | 11/1999 | Heinz-Dieter |
| 7,111,611 B1 | 9/2006 | Lyon |

(Continued)

FOREIGN PATENT DOCUMENTS

DE      4208522 A1    9/1993

(Continued)

OTHER PUBLICATIONS

V. Kalinin; RF Rotary Couplers for Contactless Torque Sensors Based on SAW Resonators; Proc. of the 22nd European Frequency and Time Forum, Toulouse, France, Apr. 23-25, 2008; 10 pages.

(Continued)

*Primary Examiner* — Max Noori
(74) *Attorney, Agent, or Firm* — Keusey & Associates, P.C.

(57) ABSTRACT

Aspects of the present invention are directed to using surface acoustic wave (SAW) sensors mounted on a disc coupling component in a powertrain to measure the torque generated by an automobile engine. The sensor may be positioned and oriented on the disc coupling component so that the phase velocities of SAWs propagating through active elements of the SAW sensors are aligned with principal strain components due to torque in the disc coupling component. The torque may be calculated by determining the difference between resonant frequencies of the active elements to suppress common-mode interference factors. In addition, SAW resonant frequencies may be communicated in a non-contacting manner by utilizing rotary and stationary couplers employing radio frequency (RF) signals. Moreover, SAW sensors may be activated and interrogated by employing targeted RF pulses having different carrier frequencies at or near respective resonant frequencies of each resonator in a SAW sensor.

47 Claims, 17 Drawing Sheets

U.S. PATENT DOCUMENTS

| | | | |
|---|---|---|---|
| 7,202,589 | B2 | 4/2007 | Kalinin et al. |
| 7,343,804 | B2 * | 3/2008 | Liu et al. .......................... 73/649 |
| 7,389,682 | B2 * | 6/2008 | JaVaherian ................ 73/117.02 |
| 2003/0000309 | A1 | 1/2003 | Anthony et al. |
| 2008/0017149 | A1 * | 1/2008 | Kokubo et al. ............ 123/90.16 |
| 2008/0278267 | A1 | 11/2008 | Beckley et al. |
| 2008/0282811 | A1 * | 11/2008 | Hill .......................... 73/862.333 |

FOREIGN PATENT DOCUMENTS

| | | |
|---|---|---|
| EP | 1353159 A2 | 10/2003 |
| GB | 2381069 A | 4/2003 |
| GB | 2417322 A | 2/2006 |
| WO | WO2004106877 A1 | 12/2004 |
| WO | WO2005075950 A1 | 8/2005 |

OTHER PUBLICATIONS

V. Kalinin et al.; Application of Passive SAW Resonant Sensors to Contactless Measurement of the Output Engine Torque in Passenger Cars; IEEE; 2007; pp. 499-504.

V. Kalinin et al; Pulsed Interrogation of the SAW Torque Sensor for Electrical Power Assisted Steering; IEEE Int'l Ultasonics and Frequency Control, Joint Annv. Conf.; 2004; pp. 1577-1580.

* cited by examiner

FIG 3. *(Prior Art)*

TORQUE MEASUREMENT WITHIN A POWERTRAIN

CROSS-REFERENCE TO RELATED APPLICATIONS

This application is a Continuation-in-Part of U.S. patent application Ser. No. 11/939,242 filed on Nov. 13, 2007 now U.S. Pat. No. 7,770,471, which is a Continuation-in-Part of International Application PCT/GB2005/003118 filed on Aug. 8, 2005 which claims priority from GB Application 0418271.3 filed on Aug. 16, 2004 and International Application PCT/GB2007/000824 filed on Mar. 9, 2007 which claims priority from GB Application 0605240.1 filed on Mar. 15, 2006.

BACKGROUND OF THE INVENTION

1. Field of the Invention

The present invention relates to methods of measuring torque within a powertrain as well as to apparatus for carrying out such methods, and more particularly to such an assembly incorporating a sensor for measuring torque transmitted through the coupling plate.

2. Prior Art

Modern internal combustion engines for automobiles, utilise engine management systems which rely on dynamometer derived data for torque output as measured on a relatively small number of test engines. This approach cannot account for the variance in performance of volume produced engines, either across the range of production tolerances or over service life, and is therefore sub-optimal.

Engine torque output is dependent on a number of variables including: rpm, ignition advance, airflow, fuel flow, barometric pressure and ambient temperature. In a modern vehicle, some or all of these variables are measured continuously and used in conjunction with a multi-dimensional memory map stored in the engine control unit (ECU) in order to predict torque.

Actual engine output torque is controlled by varying air flow, fuel flow and ignition advance in response to driver demand, i.e. the position of the accelerator pedal, and in accordance with ambient temperature and pressure conditions. Engine management maps may be determined in order to minimise fuel consumption and/or emissions or, for example in a racing car, to maximise torque and/or power.

In principle an internal combustion engine can be thought of as a "torque pump". Within the discipline of control engineering, it is generally recognised that one of the most effective and accurate ways in which to control the output of a device is to directly measure the output variable of interest and use it as a real-time negative feedback signal in a closed loop control system. Since the principal output of an automotive internal combustion engine is torque, then a torque sensor placed as close as possible to the engine output, i.e. the rear end of the crankshaft, offers the ideal route to improved engine control.

A further benefit of accurate real time torque measurement is in the control of automatic transmissions since, if gear ratio changes are carried out at zero torque or other controlled torque values, improvements can be made in gear change smoothness or speed. The ability to measure torque directly at the engine output can lead to a significant step forward in this application.

Historically, direct measurement of torque in a powertrain has been primarily restricted to engine research and development using techniques such as:

a brake dynamometer to measure engine or engine+transmission torque outputs. This approach effectively averages the torque output over a time period dependent on the bandwidth of the instrumentation. However, because of rotary inertias distributed throughout the powertrain, this technique cannot yield the instantaneous torque output of the engine at the crankshaft output.

strain gauged torque cells are used routinely in R&D applications. However they are far too expensive for use in customer vehicles. They also require slip ring systems to transmit power and signals between the rotating powertrain and the stationary chassis or rig.

magneto-elastic torque sensors have been applied to test vehicles and some racing cars. They are applicable to shaft mounting and require typically 20-50 mm of shaft length for their installation. Such space is at a premium in production powertrains and may be unavailable in systems incorporating automatic transmissions. In addition magneto-elastic sensors are susceptible to stray magnetic fields which abound in production vehicles due to multiple electric motors and solenoids.

In an automatic transmission equipped automotive powertrain, the engine output is transferred from a bolted flange at the end of the crankshaft, via a flexible steel disk (flexplate), to the torque converter by a second group of bolted fastenings (typically 3 or 4) on a significantly larger radius. The flexplate also carries the starter ring gear around its periphery.

Torque generated by the engine is transmitted by developing shear strain within the disk material, which in principle can be sensed by applying at least one pair of linear strain transducers oriented at +/−45° to a line radiating from the centre of the fl explate. The approach to torque measurement in an essentially rigid disk component is understandable to those skilled in the art of transducer design and disclosed in DE 4208522. However, a flexible disk coupling component such as a flexplate, in its normal duty, is potentially subject to three forces and two couples apart from the desired couple (i.e. in-plane torque), and these extraneous loads can reduce the accuracy of the torque measured using a strain sensor mounted on the disk.

The problem of measuring torque in a flexplate (a standard automotive component which transfers torque from the crankshaft to the torque converter) is that the flexplate must be flexible (compliant) with regard to axial loading and to out-of-plane bending but stiff in torsion. The axial loading can be due to axial movement or expansion (due to internal pressure) of the torque converter, whereas the out-of-plane bending can be caused by any angular misalignment between the crankshaft axis and the automatic transmission axis. Flexplate compliance means that high stresses, due to axial loading and out-of-plane bending, which might lead to vibration within the vehicle and fatigue failure of the flexplate, are prevented. The successful design of a torque sensing flexplate hinges on the ability to be able to minimise and separate the unwanted strains due to axial loading and out-of-plane bending from the wanted strains due to engine torque. The prior art has not been able to achieve this goal.

There are numerous examples of sensors for measuring the torque or twist in a shaft with the purpose of monitoring its safe operation or to effect control of some upstream or downstream piece of equipment, for example in an engine or a driven wheel. Indeed it is recognised within the automotive industry, that sensing torque is theoretically one of the best ways for effecting control of internal combustion engines and for torque distribution within all-wheel-drive systems. However the reliable and cost effective provision of such torque sensors in automotive applications has thus far been problematic. For example, in an automotive crankshaft or gearbox output shaft, there is typically either no available physical space on the shaft in which to locate such a torque sensor or the strain field is inappropriate—either too low in strain or too high in strain gradient.

Prior art systems are known, such as that illustrated in FIG. 3 of the present application, in which torque in a shaft is monitored by measuring the strain, in particular the bending strain arising on the circumferential faces (at either end of the internal faces) of spokes through which the torque in the shaft is transmitted.

SUMMARY OF THE INVENTION

According to the present invention there is provided a method of measuring torque in a shaft of a drive line including a disc coupling component, the method comprising measuring the shear strain field on an axial surface of the disc coupling component and calculating the torque in the shaft using said strain measurements.

The present invention further provides a drive coupling system comprising at least one shaft drivingly coupled to a disc coupling component for transmitting drive from said shaft, and at least one strain sensor mounted on an axial surface of the disc coupling component for measuring the shear strain field on said disc coupling component.

Reference above and hereinafter to an axial surface means a surface which is perpendicular to the shaft axis.

More particularly, in the present invention, torque is measured within a powertrain by the measurement of the principal strains due to shear directly on the surface of flanged, disc or webbed sections of existing Powertrain components by using sensing elements placed on a surface perpendicular to the shaft axis. Typically, the disc coupling components are shaft input/output flanged couplings, flexplates or indeed any component that provides a web or disc surface that transmits torque through the powertrain.

Although an engine is described herein as providing torque to a disc coupling component, it should be understood that an electric motor and other means for generating torque to propel an automobile are equivalent to an "engine."

The present invention derives from the recognition that the principal components of shear strain arising in a disc coupling component in a drive train are analogous to the strain field developed on the surface of the shaft in torsion, i.e. the principal strains are equal and opposite, tensile and compressive, and oriented at +/−45° to the circumferential direction in the disc component. As a result the greater space available on the disc coupling components, such as the flexplate which is used to connect a crankshaft to a torque converter in a typical powertrain with an automatic transmission, the web of a flanged coupling located, for example, between the gearbox output and the prop shaft, can be used to mount a strain sensor which, due to size constraints, cannot be located directly on the shaft. This has the advantage of requiring little or no change to the leading dimensions of major components whilst enabling monitoring of the full torque transmitted between those components.

Preferably, the strain sensor is a wireless sensor, in particular a Surface Acoustic Wave (SAW) sensor, and it is particularly advantageous to use a SAW sensor having 2 active elements such as resonators or reflective delay lines at different orientations so as to enable both principal strains to be monitored by a single sensor A reflective delay line exhibits a broadband response and can be interrogated in both the time and frequency domains. The physical quantity measured on a delay line is a time or phase delay. A resonator is a narrowband device that may be used to determine torque by measuring frequency, as discussed herein below. When torque is applied to the disc coupling component it causes strain in the sensor substrate. The strain modifies the phase delay in the delay line. Similarly, it modifies the phase delay in the resonator's cavity thus changing its resonant frequency.

In accordance with exemplary implementations of the present invention, the active elements may be positioned so that the phase velocity directions of the SAWs propagating through the resonators are respectively aligned with principal strains due to torque in the disc coupling component. In such an orientation, the difference ($F_m$) between resonant frequencies is indicative of the torque generated by the engine. Advantageously, determining the torque from $F_m$ enables suppression of common-mode interference factors, such as certain bending modes and, within limits, variations in temperature. Furthermore, according to other exemplary aspects of the present invention, the torque sensitivity variation with temperature may be further reduced by adjusting and exploiting the cut angle of the SAW sensor substrate. For example, the angle of the rotated Y-cut for a quartz substrate may be between 30 and 38 degrees while maintaining the angle of the SAW phase velocities at or near 45 degrees from the crystallographic X-axis of the substrate to permit calculation of the generated torque. Here, the crystallographic X-axis of the substrate should be aligned with, or normal to, a radial direction of the disc coupling component. In this way, for example, the sensor may operate within a narrow frequency range and a wide temperature range from −40° C. to +125° C.

In another exemplary implementation of the present invention, accuracy of the measured torque may be further improved by adjusting its value based on a measured temperature. For example, the SAW sensor configuration may include a third resonator that is optimized for measuring temperature by determining a frequency difference ($F_t$) between resonant frequencies of the third resonator and one of the other resonators. In addition, the angle between the third resonator and one of the other resonators may be optimized by considering the temperature sensitivity of the third resonator and the reflectivity of its gratings. For example, if the crystallographic X-axis of the quartz substrate of the SAW sensor is aligned with, or is normal to, a radial direction of the disc coupling component, and if the angles of the SAW resonators measuring torque to the crystallographic X-axis are at or near +/−45°, then the angle of the phase velocity directions of SAWs propagating through the third resonator may be between 0 and 30 degrees from the crystallographic X-axis.

The sensor is preferably located on a web portion of disc coupling component through which torque between the input and output is transmitted. This web portion may be suitably sized and shaped to concentrate the torsional (shear) strain and hence improve the resolution and accuracy of measurement.

A further aspect of the present invention provides a drive coupling system comprising at least one shaft drivingly coupled to a flexible disc coupling component for transmitting drive from the shaft, the disc coupling component having a plurality of circumferentially distributed axial through-apertures formed therein so as to define, between each pair of adjacent apertures, a radially extending web, a plurality of circumferentially distributed axial fastening holes extending through the disc coupling component for drivingly attaching it to an output member, and a strain sensor or plurality of strain sensors for measuring the shear strain field on said disc coupling component, wherein each said strain sensor is mounted in a countersunk recess formed in an axial surface of one of the webs such that each (the) sensor lies at least proximate to the local neutral axis of the disc coupling component.

Such a drive coupling system has the advantage that locating the or each sensor on the local neutral axis of the disc coupling component minimises superimposed bending strains due to couples acting out-of-plane on the coupling component.

Preferably, a plurality of circumferentially extending slots are formed in the disc coupling component between each fastening hole and the outer edge of the disc coupling component. The ligaments, formed between these circumferentially extending slots and the adjacent apertures, are essentially flexures which absorb to a significant extent the deflection due to unwanted axial loading and out-of-plane bending and adjust the axial compliance of the coupling component, which thereby increases the measuring accuracy of the sensor.

Several techniques are involved in providing accurate measurement of torque and rejection of unwanted signals, while maintaining the original design axial compliance, and non contacting sensing capability:

1) The distribution of holes on the drive coupling plate, designed to achieve a certain level of axial compliance, is modified so as to generate a small number (typically 3 or 4) of webs to concentrate the shear strain.
2) The active surfaces of the measuring sensors are placed on the local neutral axis of the drive coupling plate, thereby minimising superimposed bending strains due to couples acting out-of-plane on the drive coupling plate.
3) The measurement sensor or sensors are placed symmetrically on the web(s) so as to minimise strains due to twisting—again due to couples acting out-of-plane on the drive coupling plate, and allow cancellation of signals caused by undesirable forces and couples by means of performing differential strain measurements
4) Decoupling slots are introduced between the torque converter fastening holes and the starter ring in order to create relatively compliant flexures which absorb, to a significant extent, the deflections due to axial loading and out-of-plane bending and adjust the axial compliance.
5) The thickness of the drive coupling plate may be increased, and the web widths reduced, in order to reduce bending strains (maximised at the surface) while maintaining the desired shear strain (distributed through the thickness) and to physically separate these strain components and to adjust the axial compliance.
6) The flatness of the drive coupling plate is improved to minimise strains due to clamping the drive coupling plate to the crankshaft flange.
7) The thickness tolerance is reduced to minimise production variation in the sensitivity of the drive coupling plate which is now essentially a transducer body.
8) The material is re-specified to ensure a sufficiently high elastic limit so the sensor performance is linear and does not exhibit hysteresis.
9) The torque transducers employed are surface acoustic wave (SAW) devices, which communicate in a non contacting manner (not requiring slip rings) and not requiring active electronic components on the drive coupling plate (no separate power supply).

Preferably, three or four through apertures are provided which correspondingly form three or four radial webs. In a particularly preferred embodiment, the through-apertures and fastening holes are equi-spaced on a common pitch circle diameter.

Preferably, the or each strain sensor is a surface acoustic wave (SAW) device, which communicates in a non-contacting manner and which does not require active electronic components on the coupling component. Exemplary embodiments of the present invention may include a rotor and stator coupler respectively attached to the disc coupling component and a portion of the automobile that is stationary with respect to the disc coupling component, such as an engine block, for example. Each of the couplers may include transmission lines, such as microstrips, for example, with annular shapes. The couplers may be employed to communicate electromagnetic signals generated from SAWs propagated through resonators measuring torque in a non-contact manner without using slip rings. The lengths of the rotor and stator transmission lines may be configured to optimize communication for typical sizes of disc coupling components. For example, the overall length of the rotor transmission line may be circa $0.25\lambda$ and the overall length of the stator transmission line may be circa $\lambda$ or an integer multiple of $\lambda$, where $\lambda$ is the wavelength at the operating frequency in the rotor transmission line. In accordance with this configuration, there is no discontinuity in the field distribution in the stator transmission line. As a result, this configuration permits minimization of angular variation of the output coupler impedance, which minimizes angular variation of the resonant frequency (or differential phase delay) of the SAW sensor connected to a rotor output and measured at a stator input.

According to other exemplary embodiments, various SAW sensor interrogation methods may be employed to determine the difference between resonant frequencies for measuring torque and/or temperature, as described herein, and to activate and power SAW sensors. To improve energy efficiency, for example, different narrowband RF interrogation pulses may be respectively utilized to activate different, corresponding resonators. For example, after a search phase is conducted to detect resonant frequencies of SAW resonators, different groups of RF interrogation pulses may each have a different carrier frequency that corresponds or is near to a resonant frequency of one of the SAW resonators. In this way, energy efficiency may be improved by specifically targeting resonant frequencies of the SAW resonators using respective interrogation pulses. In accordance with another exemplary embodiment, a continuous wave interrogation signal with a variable frequency may be employed to determine resonant frequencies of resonators.

In other aspects of the present invention, the or each SAW sensor is preferably symmetrically located on its associated web, in particular on the radial centre line thereof. In this way, non-symmetrical effects, such as strains due to twisting resulting from couples acting out of plane on the coupling component are further minimised.

The webs are also preferably narrow so as to further decouple sensor output from deflections caused by unwanted forces and moments.

Advantageously, each aperture comprises a pair of wings which are symmetrical about a radial centre line of the aperture. The apertures are furthermore preferably symmetrically distributed around the coupling component, as are the fastening holes.

BRIEF DESCRIPTION OF THE DRAWINGS

In order that the invention may be well understood, there will now be described some embodiments thereof, given by way of example, reference being made to the accompanying drawings, in which:

FIG. 1b is a cross-sectional view through the flexplate of FIG. 1a.

DETAILED DESCRIPTION OF THE PREFERRED EMBODIMENT

Figure 1A:
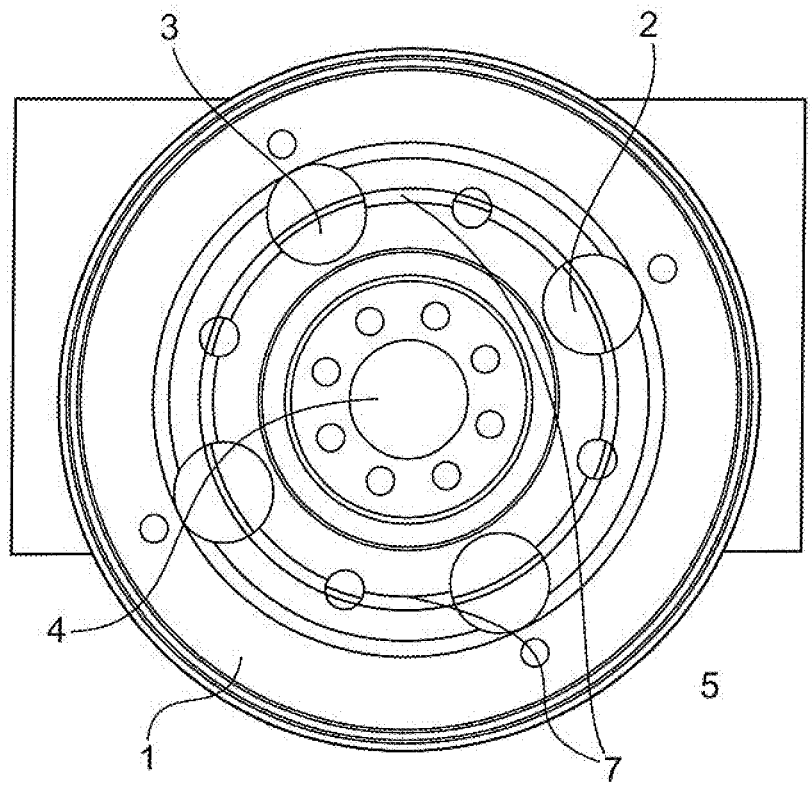
FIG. 1a is a front view of a flexplate which may be used in conjunction with the present invention to measure torque in a shaft of a drive train.
Figure 1B:
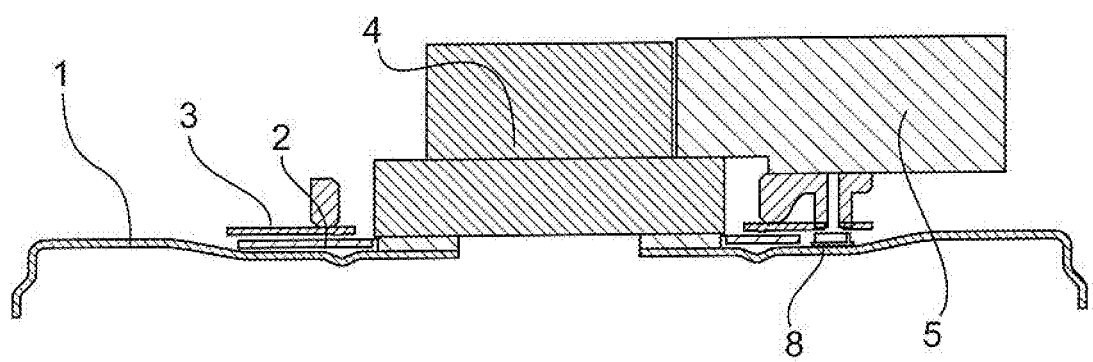

Referring to FIG. 1a, there is shown a flexplate 1, essentially a diaphragm which connects the crankshaft and the torque converter in a typical powertrain with automatic transmission, which is mounted on a crankshaft 4 which extends through an engine block 5. The flexplate is configured with cutouts to provide the required flexibility, forming spokes 7 therebetween, and, as shown in FIG. 1b, in the illustrated example a SAW sensor 8 is fastened to the engine block side of one of the spokes 7 for measuring the local strain field on the surface of the spoke, which is in turn proportional to the torque within the crank shaft 4. Also attached on the engine side of the flexplate 1 is a rotating coupler 2 which rotates with the flexplate and communicates with a stationary coupler 3 fastened to the engine block 5 for wireless transmission of signals from the SAW sensor. The stationary coupler, in the illustrated embodiment, is fastened to the block so as to maintain a small but consistent axial gap to the rotating coupler.

Figure 2:
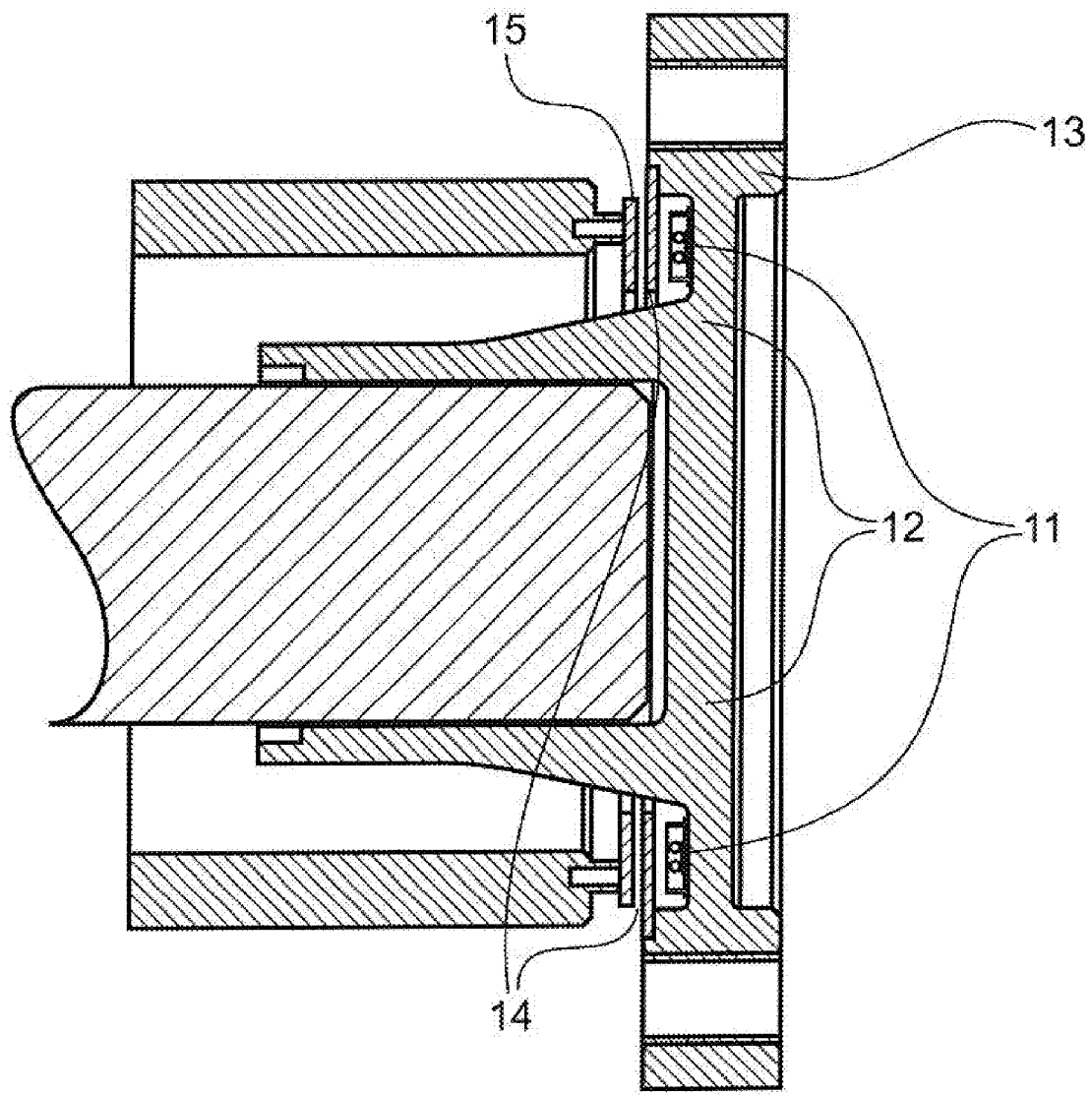
FIG. 2 is a cross-sectional view through a flanged coupling which may be used in conjunction with the present invention.
Figure 3:
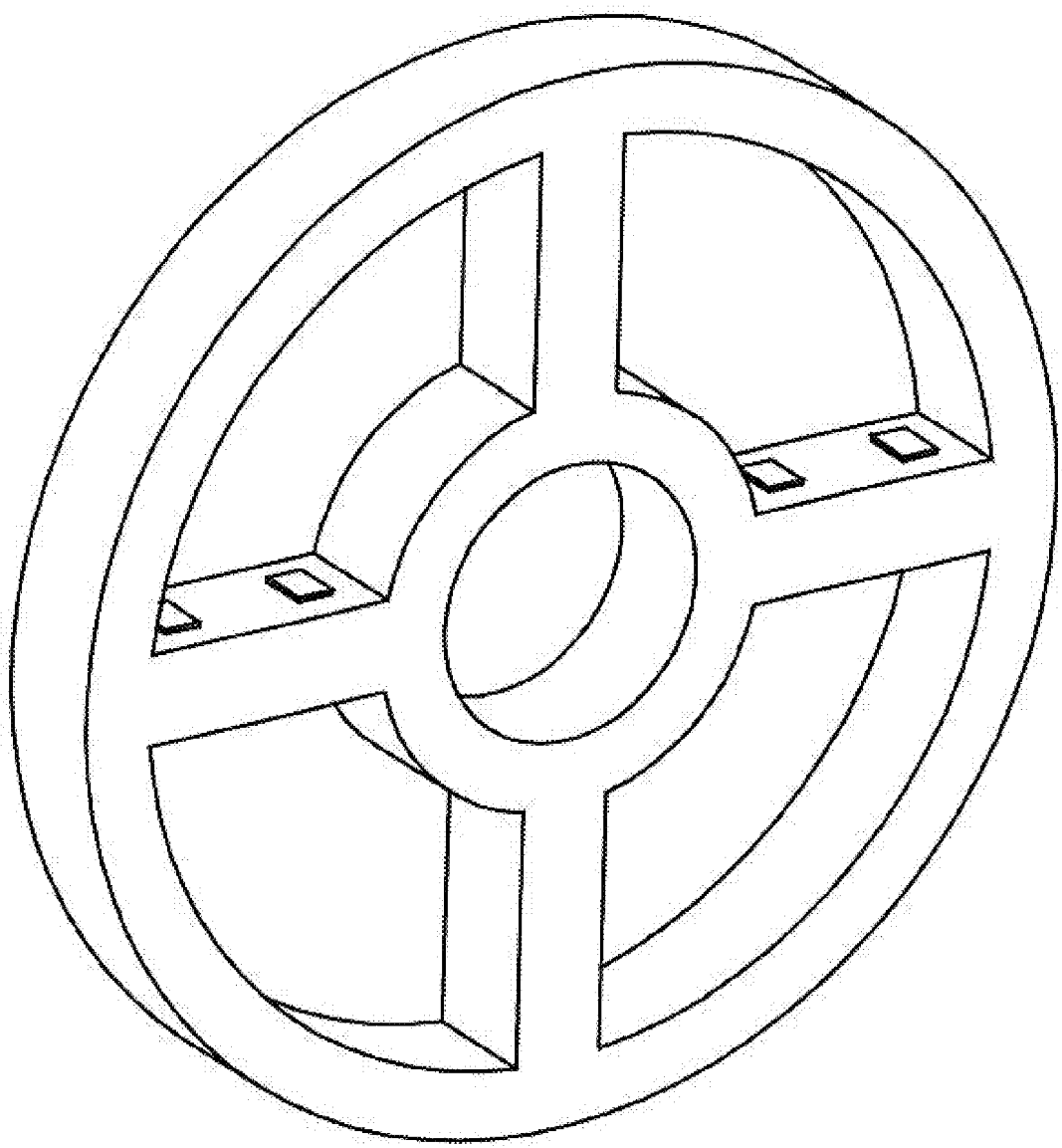
FIG. 3 is a cross-sectional view of a prior art arrangement.

In a second embodiment shown in FIG. 2, a SAW sensor 11 is mounted on a radial web 12 formed on a flanged coupling 13 such as that provided between the gearbox output and the propeller shaft of an engine. The web extends between the input and output connects of the coupling so that all torque transmitted therethrough passes through the web 12. In this way, the strain field within the web can be used accurately to mirror the torque within the shaft to which the coupling is attached. A rotating RF coupling 14 is fastened to the flanged plate 13 for rotation therewith and is electrically coupled to the SAW sensors 11. A static RF coupling 15 is then mounted in juxtaposition with the rotating coupling 14 for receiving signals from the latter in the form of the output from the sensors.

The above location for strain sensing, when coupled with the non-contacting wireless SAW technology of Transense Technologies plc, provides a unique and cost effective solution to a challenge that has faced the automotive world for many years.

Figure 8:
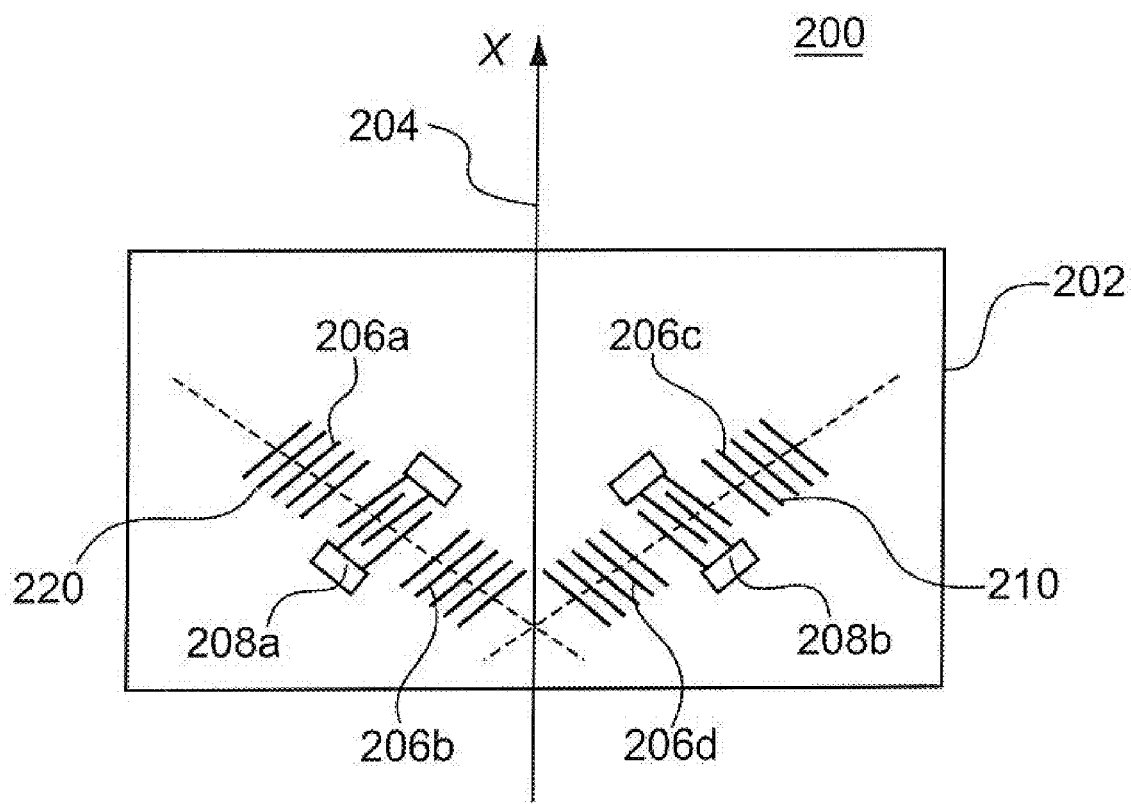
FIG. 8 is a schematic of an exemplary implementation of a SAW sensor that is optimized for measurement of a torque on a flexplate.

Referring now to FIG. 8, a schematic of a SAW sensor 200 in accordance with one or more implementations of the present invention is illustrated, SAW sensor 200 may be employed as sensors 8 and 11, discussed above. Preferably, the SAW sensor 200 is a wireless sensor, in particular a passive SAW sensor that does not require a local power source for its operation. The SAW sensing element may be based on two SAW one-port resonators electrically connected to each other. U.S. Pat. No. 7,202,589 provides examples of a SAW sensor that may be employed in implementations of the present principles and is incorporated herein by reference. One embodiment of the SAW sensor is shown in FIG. 8. The sensing element may comprise a piezoelectric substrate 202 made of a rotated Y-cut quartz. Preferably, the substrate is Y+34° cut quartz or has a cut at an angle close to +34°. Two one-port SAW resonators 210 and 220 are positioned on the substrate surface in such a way that the directions of the phase velocity of SAWs propagating in the resonators are at ±45°, or close to these angles if the cut angle somewhat differs from 34°, to the crystallographic X-axis 204 of the substrate as shown in FIG. 8. One of the advantages of this arrangement is that zero temperature coefficients of frequency can be achieved for both resonators at room temperature while both resonators are positioned on a single substrate at an angle to each other providing the highest torque sensitivity. The arrangement permits improved temperature stabilisation of the sensor and enables the sensor to operate within both a smaller frequency range and a wide temperature range from −40° C. to +125° C., which is typical for automotive applications.

Figure 9:
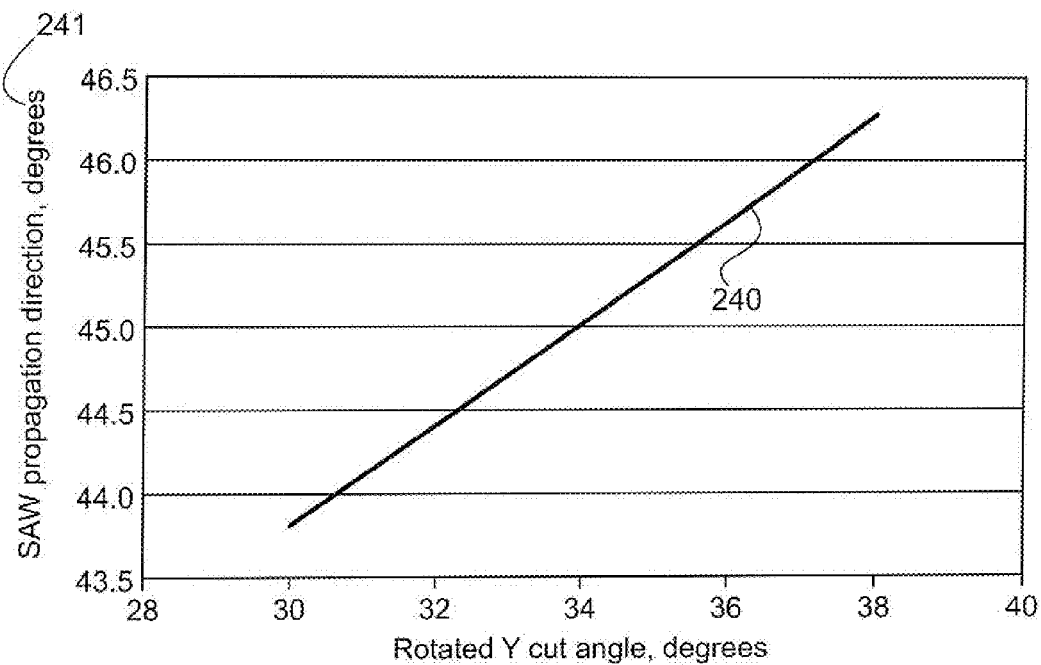
FIG. 9 is a graph illustrating a theoretical relationship between a SAW phase velocity propagation direction angle to the crystallographic X-axis of a SAW sensor substrate and a rotated Y-cut angle of the substrate. Here, the SAW propagation direction and corresponding rotated Y-cut angles provided in the plot minimize the variation of SAW resonant frequencies with temperature.

With reference to FIG. 9, a graph 240 plotting an angle 241 between SAW propagation directions (i.e. directions of the phase velocities) for resonators measuring torque and a crystallographic X axis of a quartz substrate versus the Y cut angle 242 in degrees is illustrated. Graph 240 provides a theoretical dependence between the SAW propagation directions of resonators measuring torque on the rotated Y cut angle such that linear coefficients of frequency at room temperature are maintained at zero. Similar plots may be easily determined for any typical operating temperature. Graph 240 is valid for a very thin aluminium film forming an interdigital transducer and reflecting gratings of the resonator. It may slightly vary with the Al film thickness. Although, the highest torque sensitivity is achieved when the SAW propagation directions for the two resonators measuring torque coincide with the principal strain components caused by the torque (i.e., the angle between the two SAW propagation directions is 90° if the crystallographic X-axis of the substrate is aligned with a radial direction of the disc coupling component or is normal to it, as discussed below), the torque sensitivity will not be greatly reduced if the angle between the SAW propagation directions differs by a small angle α (from 90°). The reduction is approximately described by the factor $\cos(\alpha/2)$. Thus, a sufficiently high sensitivity to torque may be obtained using rotated Y cut angles between 30 and 38 degrees, for example, for the substrate with corresponding SAW propagation direction angles according to plot 240.

With continuing reference to FIG. 8, each one-port SAW resonator may comprise an interdigital transducer (IDT) (208a or 208b) and two periodic reflecting gratings (206a,b or 206c,d) positioned on both sides of the IDT (the fingers of the IDT and the stripes of the gratings are normal to the phase velocity (propagation direction) of the SAW). The SAW resonators may operate at UHF. The Q factor of the SAW resonators may be very high, around 10000, thus permitting wireless measurement of their resonant frequencies with a very high accuracy. For example, if the resonant frequencies of resonators 210 and 220 are 437 MHz and 435 MHz respectively, they can be measured in a non-contact way with a resolution of 1 kHz or better. The distance between the resonant frequencies may be selected such that the resonant peaks do not cross each other at any value of torque or temperature within the operating range. In other words, the resonant frequencies of the SAW resonators do not cross each other at any value of applied principal strain due to torque and temperature. For example, depending on the application, the applied principal strain may preferably be within the range of −250 microstrain to +250 microstrain and the temperature may preferably be within the range of −40° C. to +160° C., Alternatively, the applied principal strain may be within the range of −500 microstrain to +500 microstrain and the temperature may be within the range of −50° C. to +200° C. For simplicity purposes. FIG. 8 does not show electrical connections between the SAW resonators but, in use, they are connected to each other, preferably in parallel.

If the substrate of the SAW sensor or sensing element is rigidly attached to a surface of the flexplate in such a way that its X axis either coincides with a radial direction of the flexplate or is normal to it, then, at certain locations on the flexplate, there will be two principal strain components in the substrate with equal values (S) but opposite signs when torque is applied to the flexplate. Here, the two principal strain components in the substrate are aligned to the two principal strain components in the flexplate due to torque. In accordance with one or more implementations of the present invention, the phase velocity directions of SAWs propagating through respective resonators 210 and 220 may be respectively aligned with each of the two principal strain components of the substrate and the two principal strain components of the flexplate due to torque. Thus, when torque is applied, one of the resonators will be in tension and the other one will be in compression. As a result, their resonant frequencies will change in opposite directions. By measuring the difference ($F_m$) between the two resonant frequencies, one can find the applied torque (M), as the difference $F_m$ is linearly proportional to the torque M. The strain sensitivity $S_s = F_m/S$ for a sensing element in accordance with an embodiment of the present invention may be at or between 2.5 to 3 kHz/microstrain and the torque sensitivity $S_m = F_m/M$ may be at or between from 0.3 to 0.7 kHz/Nm for typical flexplates used in passenger cars.

Measurement of torque based on measurement of the difference frequency $F_m$ permits suppression of a number of common-mode interference factors including variable impedance of the RF rotary coupler, certain bending modes and, within limits, variation in temperature. An important feature of the design of the SAW sensing element described above is that it allows a noticeable reduction of torque sensitivity variation ($dF_m/dM$) with temperature.

For example, the main factors contributing to the temperature variation of the sensitivity are:
 1. Linear temperature coefficient of expansion,
 2. Non-zero third-order elastic constants,
 3. Temperature variation of the first-order elastic constants,
 4. Temperature variation of the substrate density,
 5. Temperature variation of the third-order elastic constants.

In the case of a conventional ST-X cut quartz substrate, the last of these factors, the temperature variation of the third order elastic constants, is substantially larger than the other factors and dominates the net result of the various factors. To a large extent, the temperature variations in torque sensitivity are caused, in the case of ST-X cut quartz substrates, by the temperature variations of the third order elastic constants (see J. Beckley, V. Kalinin, M. Lee, K. Voliansky. "Non-contact torque sensors based on SAW resonators". 2002 IEEE Int. Frequency Control Symposium, 29-31 May, New Orleans, USA, 2002, pp. 202-213). A means by which the overall variation of the torque sensitivity, $dF_m/dM$, with temperature may be substantially decreased includes reducing the influence of the temperature variation of die third order elastic constants of the substrate on the torque sensitivity to a level at which, to a significant extent, it is cancelled out by the net result of the other four factors outlined above. If factor 5 outlined above is reduced to a level at which it is substantially equal, and opposite, to the sum effect of factors 1-4, a SAW sensor with a very low variation of sensitivity, $dF_m/dM$, with temperature may be produced.

In accordance with one preferred embodiment of the invention, the resonators 210, 220 of a SAW sensor are laid down on a substrate of cut quartz so that the surface acoustic waves propagate at an angle relative to the quartz X axis. At this angle, the contribution of temperature variations of third order elastic constants of the substrate to the temperature variation of the torque sensitivity, $dF_m/dM$, is substantially equal and opposite to the sum total of variations in linear temperature coefficient of expansion, non-zero third order elastic constants, temperature variation of contributions caused by first order elastic constants, and temperature variations of substrate density. If the resonators are positioned such that the phase velocity directions of SAWs propagating through respective resonators 210 and 220 are respectively aligned with each of the two principal strain components at ±45° to the crystallographic X-axis 204 of the substrate, then the quartz should be cut at an angle of Y+34° to reduce the torque sensitivity variation with temperature as discussed above (a small deviation of the cut angle from 34° and the respective small deviation of the propagation directions from X±45° according to FIG. 9 is acceptable). Reduction of torque sensitivity variation with temperature is an important feature for automobile applications, where the operating temperature range is quite wide.

However, it should be understood that full temperature compensation of the torque sensing element with two SAW resonators is difficult to achieve in practice for at least two reasons. First, there is still a certain residual variation of torque sensitivity $S_m$ with temperature, which is approximately 2-6% over the entire automotive temperature range. Second, the sensor offset also varies with temperature due to microscopic differences between the two SAW resonators and angular alignment errors. As a result, full temperature compensation of the SAW torque sensor reading may be achieved if the sensing element also provides information about local temperature. Such a SAW sensing element capable of measuring both torque and temperature that may be employed in various implementations of the present invention is disclosed in the U.S. patent application Ser. No. 11/920,678, entitled SAW Torque and Temperature Sensor, filed on Nov. 19, 2007, which is incorporated herein by reference.

Figure 10:
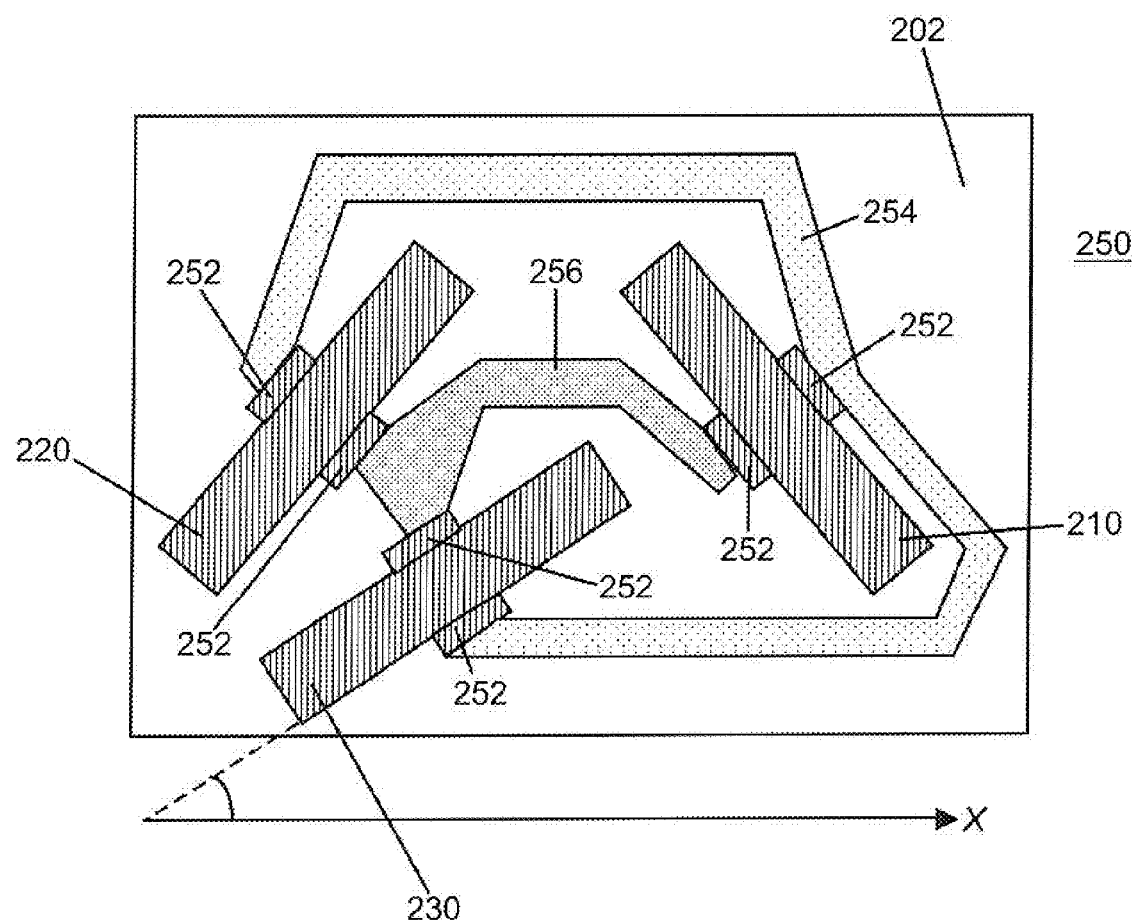
FIG. 10 is a schematic of an alternative exemplary implementation of a SAW sensor that is optimized for measurement of a torque and a temperature on a flexplate.

With reference to FIG. 10, showing a SAW sensor 250, the temperature measurement capability may be achieved by adding one more SAW resonator 230 to the design illustrated in FIG. 8. FIG. 10 does not show a detailed design of the SAW one-port resonators, each comprising an IDT and reflecting gratings, because it is well known to one skilled in the art. FIG. 10 illustrates the area occupied by the resonators 210, 220 and 230, the IDT bus bars 252 of each SAW resonator and tracks 254 and 256 electrically connecting all three resonators in parallel and also playing the role of the sensor's contact pads. As discussed above, the SAW sensor or sensing element includes the piezoelectric substrate 202 and the two SAW resonators, 210 and 220, for torque measurement. Other than the contact pads and conducting tracks, the resonators 210 and 220 of FIG. 10 are exactly the same as the resonators 210 and 220 of FIG. 8.

Resonator 230 should have a resonant frequency different from the two other resonators. For example, the resonant frequency of resonator 230 may be 433 MHz, the resonant frequency of resonator 210 may be 437 MHz and the resonant frequency of resonator 220 may be 435 MHz. The resonant frequency of resonator 230 should not exceed the resonant frequency of resonator 220 at any torque and temperature values within the operational range. A preferred angle for the resonator 230 is 30°, as it permits the highest sensitivity of the frequency difference ($F_t$) between the resonators 220 and 230 to temperature of around 2 to 3 kHz/° C. and at the same time ensures sufficiently high reflectivity of SAWs from the reflecting gratings, which may be composed of aluminium strips.

The SAW sensor 250 design ensures that the frequency difference $F_m$ is mainly sensitive to torque with a small sensitivity to temperature and the frequency difference $F_t$ is mainly sensitive to temperature with a small sensitivity to torque. In this way, the SAW resonators 210 and 220 may be optimized for torque measurement while SAW sensor 230 may be optimized for temperature measurement. By measuring $F_m$ and $F_t$ wirelessly, both torque (M) and temperature (T) can be easily determined on the basis of previously measured calibration characteristics of the SAW sensor.

Figure 11:
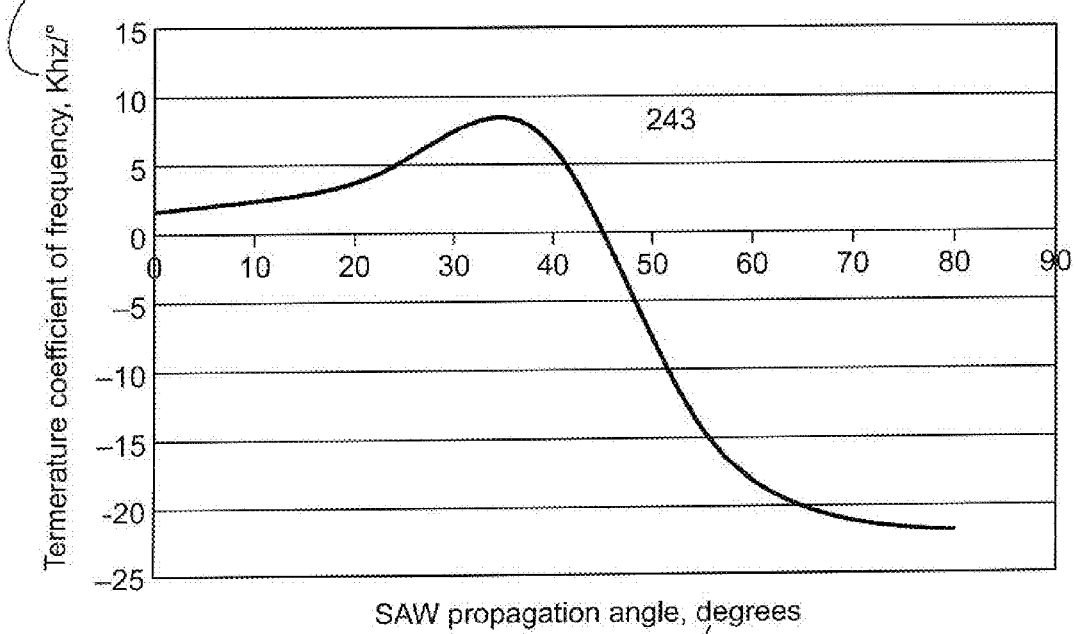
FIG. 11 is a graph illustrating a theoretical relationship between the temperature coefficient of frequency of a resonator dedicated for temperature measurement and the propagation angle of the phase velocity direction of SAWs propagating through the resonator to the crystallographic X-axis of a SAW sensor substrate.
Figure 12:
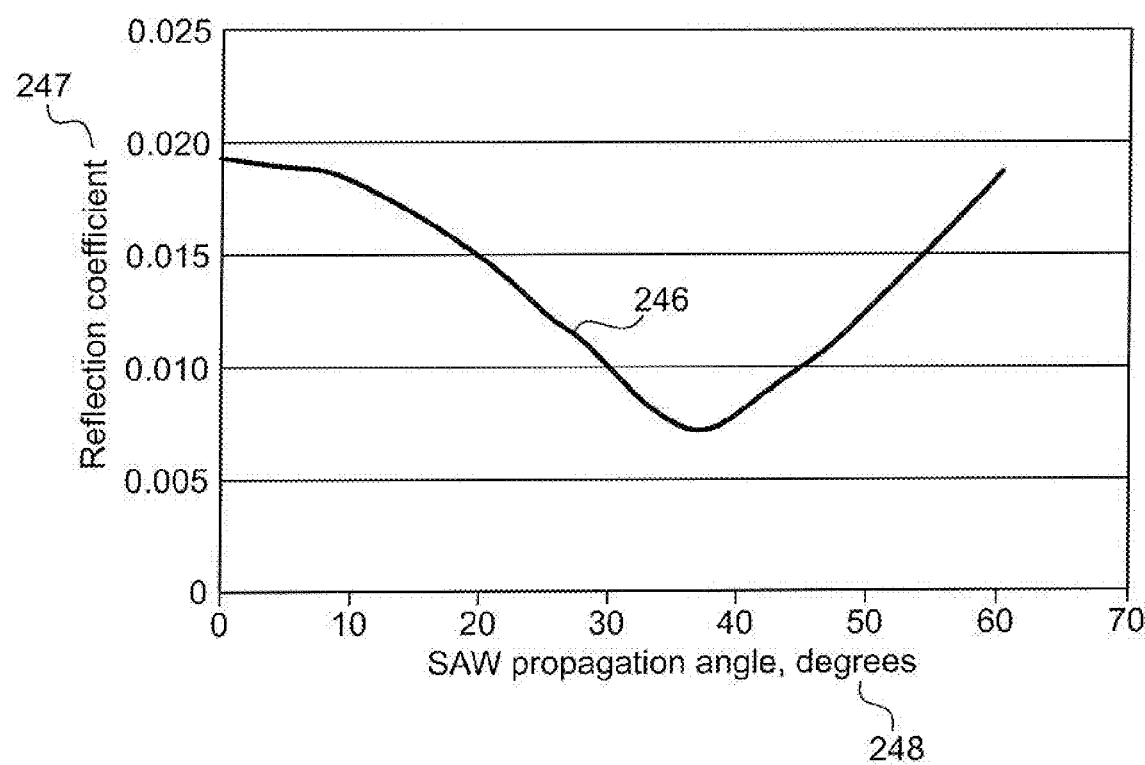
FIG. 12 is a graph illustrating a theoretical relationship between the reflection coefficient of a SAW resonator dedicated for temperature measurement and the propagation angle of the phase velocity direction of SAWs propagating through the resonator to the crystallographic X-axis of a SAW sensor substrate.

With reference to FIGS. 11 and 12, in order to measure temperature by determining the frequency difference $F_t$ between resonators 220 and 230, their temperature characteristics should be different. This may be achieved by selecting the SAW propagation direction for resonator 230 different from the one for resonator 220. Because the temperature sensitivity of the resonant frequency of resonator 220 is quite small, the temperature sensitivity of $F_t$ is mainly determined by resonator 230. FIG. 11 presents a graph 243 illustrating a theoretical variation of the temperature coefficient of frequency (kHz/°) 244 of resonator 230 with the SAW propagation angle 245 in degrees to the X axis of the substrate for Y+34° cut quartz and a very thin Al film.

As the angle approaches zero, the temperature sensitivity tends to decrease. For angles below 15°, the thermal variation of the resonant frequency becomes non-linear such that the unambiguous temperature measurement range may not cover the entire automotive range. The best linearity of the temperature characteristic and the highest temperature sensitivity is achieved at 35°. Unfortunately, as shown in FIG. 12, illustrating a graph 246 of the SAW reflectivity coefficient 247 in resonator 230 versus the SAW propagation angle 240 in degrees, the SAW reflectivity from the Al stripes forming the gratings becomes quite low at 35° for a typical metallization thickness. As a result, the Q factor of the SAW resonator is also rather low at this angle. The propagation angle of 30° can be selected as a compromise between sufficiently high reflectivity of the gratings and sufficiently high temperature sensitivity and linearity of $F_t$ as a function of temperature.

As illustrated in FIG. 12, an alternative SAW propagation angle giving sufficient temperature sensitivity and an acceptable reflectivity of the gratings could be selected above 50°. However, the electro-mechanical coupling coefficient characterising efficiency of SAW excitation is halved at 50° in comparison with the range of angles from 0° to 30° and it rapidly approaches zero at the angles between 50° and 90°. Thus, the third resonator 230 should preferably be positioned at such an angle that the vector of the phase velocity of the SAW propagating in it is at an angle from 0 to 30° to the crystallographic X axis of a substrate made of Y+34° cut quartz, or a substrate with a cut angle close to it, as discussed above.

If aluminium film is used for the fabrication of resonators on the quartz substrate, the temperature sensitivity of $F_t$ and the linearity of calibration characteristic $F_t(T)$ depend on the thickness of the aluminium film. It has been discovered that the characteristic $F_t(T)$ becomes quite non-linear at high temperatures if the Al film thickness exceeds 260 nm. Further, if the Al film thickness is reduced, the temperature sensitivity of $F_t$ and the linearity is improved. However, at some point a further reduction will lead to deterioration in the resonators' Q factor. Patent Application GB0711765.8, incorporated herein by reference, discloses a design of the sensing element that may be employed in one or more implementations of the present principles, whereby the ratio of the Al film thickness to the SAW wavelength is limited within the range from 0.021 to 0.032. Preferably, the Al film thickness should be within the range 160 nm to 240 nm for resonant frequencies from 428 MHz to 437 MHz.

The torque and temperature SAW sensor 250, which has at least three resonators, is capable of providing temperature-compensated torque information that is insensitive to certain bending modes generating common-mode interference. However, other bending modes, generating differential-mode interference, may not be suppressed. In order to suppress them, one more SAW sensing element that is positioned and oriented symmetrically relative to the first one on the diametrically opposite side of the flexplate may be utilized. This second SAW sensing element or sensor does not have to have the third resonator 230 to measure temperature, as the temperature should be the same as, or very close to, the temperature measured by the first sensing element or sensor. The second SAW sensing element may have a design as illustrated in FIG. 8, for example. However, the two resonant frequencies of the resonators in the second SAW sensor should be different from those of the first sensor. For example, the resonant frequencies of the resonators in the second SAW sensor may correspond to 429 MHz and 431 MHz, respectively. In this case, the second sensor may be interrogated through the same stator coupler as the first one. If the flexplate design and its method of attachment to the torque converter are such that bending is not an issue, then only one SAW sensing element may be effectively used such that only three resonant frequencies may be measured to determine the torque. If bending modes of the flexplate create substantial differential-mode interference, then two sensing elements should be used and five corresponding resonant frequencies should be measured in total to determine the torque. The two frequency differences $F_{m1}$ and $F_{m2}$ between the resonators 210 and 220 of each SAW sensor should be averaged before torque is calculated on the basis of $F_m=(F_{m1}+F_{m2})/2$ and $F_t$.

The substrate of the SAW sensing element may be directly bonded to the surface of the flexplate. However, it may be difficult to provide protection of the surface of the SAW device and bonding wires electrically connecting the SAW device to the rest of the system if the SAW sensor is directly bonded to the substrate surface. In order to provide this protection as well as to simplify assembly of the flexplate torque transducer and alleviate logistical problems, the SAW device should be packaged.

Figure 13:
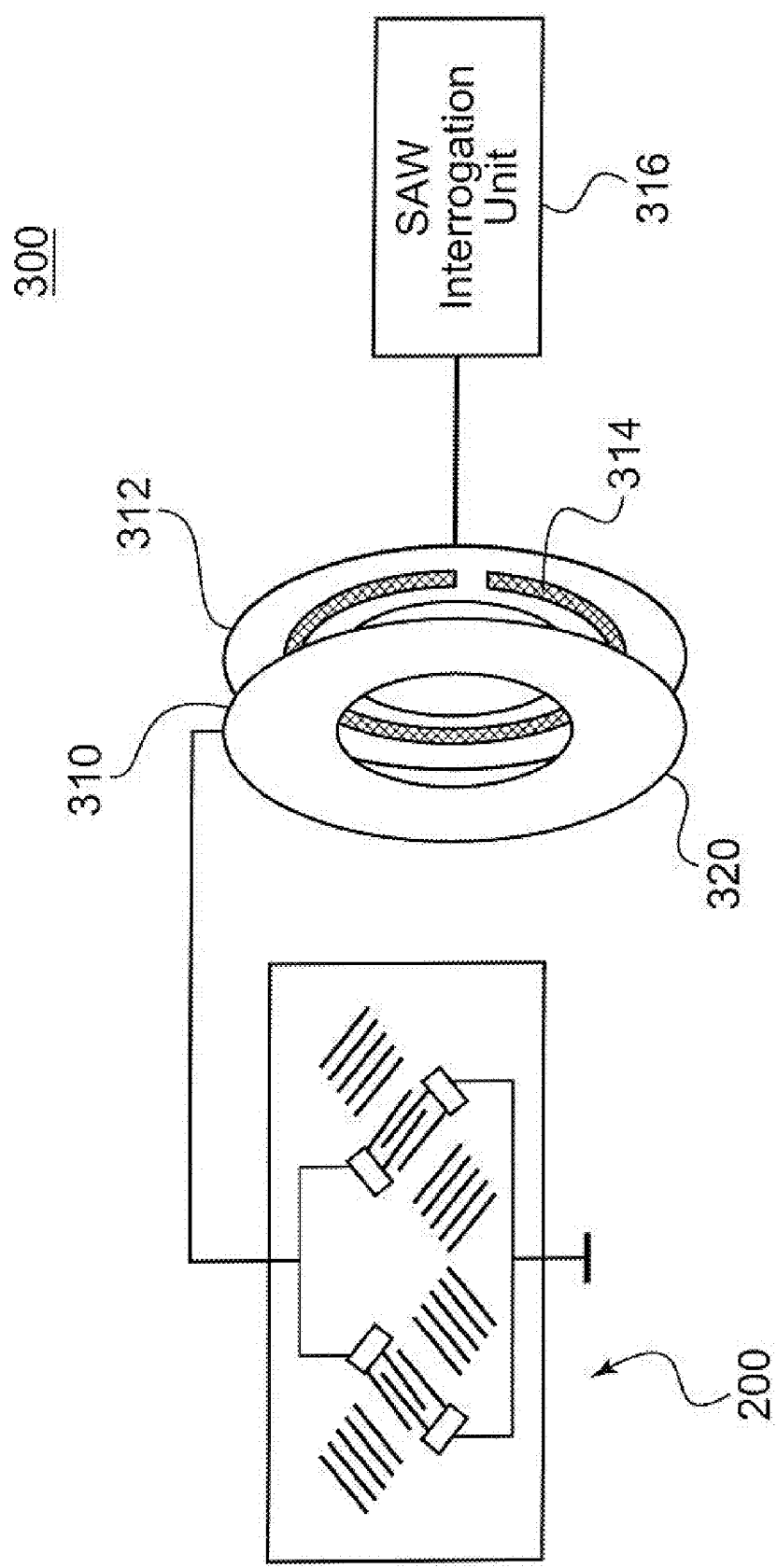
FIG. 13 is a high-level block diagram of an exemplary rotor coupler system implementation employed to transmit interrogation and SAW response information for determination of torque applied through a flexplate.
Figure 14:
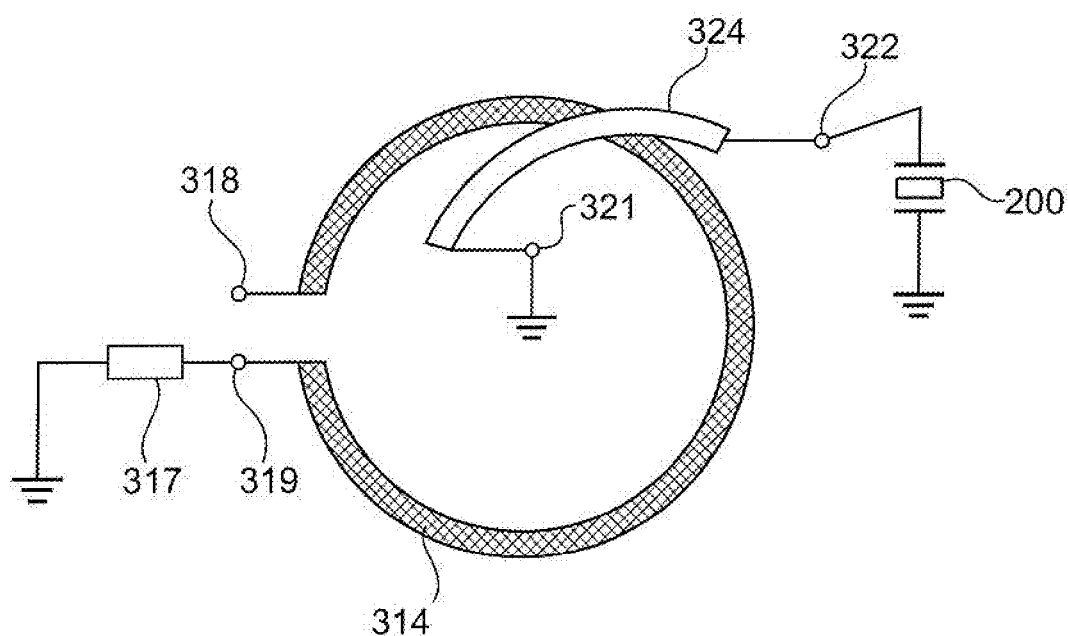
FIG. 14 is a schematic illustrating stator and rotor microstrips employed in an exemplary rotor coupler system.

Referring now to FIGS. 13 and 14 with continuing reference to FIGS. 1b and 2, a rotary coupler 310 that may be employed to transmit interrogation signals and corresponding reflection information to and from a SAW sensor, respectively, in accordance with various exemplary implementations of the present principles is illustrated. The SAW sensing element(s) or sensor(s) 8, 200 attached to the flexplate may communicate in a non-contacting manner with a stationary electronic SAW interrogation unit (SIU) 316. One advantageous aspect of communicating in a non-contact manner is that use of slip rings is avoided. To perform the non-contact measurement of three or five SAW resonant frequencies, for example, the SIU 316 may be connected to the SAW sensing sensor(s) 200 through a radio frequency (RF) non-contact rotary coupler 310 including a stator coupler 312 and a rotor coupler 320 as shown in FIG. 13. The stator coupler 312 and rotor coupler 320 may, for example, correspond to the rotor 2, 14 and stator 3, 15 couplers illustrated in FIGS. 1b and 2. The coupler 310 may be configured to transmit RF interrogation signals from the SIU to the SAW sensor 200 and to transmit the reflected signals from the SAW sensor 200 back to the SIU 316 by means of a distributed electro-magnetic coupling of a stator microstrip 314 of the stator coupler 312 and rotor microstrip 324 of the rotor coupler 320 facing it. For example, the rotor microstrip 324 may receive signals generated from the reflected SAWs and convert the signals to electromagnetic waves that are received by the stator microstrip 312 for processing and determination of the torque generated by an engine and transmitted through the flex plate. Here, the interrogation signals may activate and power the SAW resonators of SAW sensor 200. Coupled microstrips can have either a planar design or a coaxial cylindrical design. A microstrip is a type of electrical transmission line and is well known in the art. Apart from coupled microstrips, the RF rotary coupler may employ other types of coupled transmission lines, such as coplanar, slot lines, etc.

The RF rotary coupler may be designed in such a way that it provides a reliable measurement of the SAW resonant frequency at any angle between the stator 312 and the rotor 320 parts of the coupler 310. Moreover, the rotary coupler may be configured such that the value of the measured resonant frequency varies as little as possible with the rotation angle. It can be shown that the above conditions are satisfied in the system illustrated in FIG. 13 if the insertion loss of the coupler 310 does not exceed −10 to −15 dB and the coupler output impedance seen by the SAW sensing element or sensor varies with the rotation angle as little as possible.

There are a number of different designs of RF rotary couplers that are known in the prior art. However, known systems are generally unsuitable for solving the above-recited problems at the frequencies under consideration. The international patent WO 96/37921, for example, describes an early system and discloses a coupler that has been designed for contactless interrogation of SAW sensors. However, the coupler disclosed only works well if the circumference of the microstrip does not exceed (0.35 . . . 0.4)λ, where λ is the wavelength at the SAW operating frequency in the microstrip. In addition, a coupler disclosed in US Patent Publication 2008/0061910 provides better stability of the measured resonant frequency and is suitable for a larger circumference up to approximately 0.6λ. However, a typical size of flexplates is such that the circumference of the coupled lines is around one wavelength, λ. In accordance with one or more implementations, rotary coupler designs disclosed in commonly-owned, co-pending U.S. patent application Ser. No. 11/885,813, incorporated herein by reference, suitable for large-diameter applications, may be employed to transmit interrogation signals and corresponding reflection information from a SAW sensor 200 to determine the torque of a flexplate. One implementation of a rotary coupler is presented in a schematic form in FIG. 14. For simplicity purposes, ground planes associated with the microstrips are not shown in FIG. 14.

The RF rotary coupler 310 may be implemented as a four-port device with the ports 318, 319, 321 and 322. The stator microstrip 314 may have an annular shape concentric with the flexplate. Similarly, the rotor microstrip 324 may also have an annular shape concentric will the flexplate. Port 318 of the stator may be connected to the SIU 316 and the opposite port 319 may be terminated by a 50Ω matched load 317 ensuring a travelling wave regime in the stator line. The circumference of the stator microstrip 314 may be close to λ or an integer number of wavelengths to ensure a minimal phase discontinuity of the RF voltage at the opposite ends of the gap between ports 318 and 319. This configuration helps minimize the angular variation of the output coupler impedance ($Z_{22}$). The rotor microstrip 324 stretches along the arc with the same radius as the stator. However, the length of the rotor microstrip 324 is at or close to $\lambda/4$. The rotor microstrip 324 may, in alternative implementations, have a length of less than $\lambda/4$. One of the rotor ports 322 may be connected to the SAW sensing element 200 and another one may be grounded such that it is short-circuited.

In theory, the coupler 310 provides variation of the measured individual SAW resonant frequency of less than 6 kHz with the rotation angle. Since the coupler output impedance $Z_{22}$ is a more broadband function of frequency than the frequency range occupied by the SAW resonators, all five resonators "see" approximately the same variation of $Z_{22}$ with the rotation angle. As a result, all five resonant frequencies vary in a similar way with the rotation angle so that the angular variation of the difference frequencies is considerably smaller than variation of the individual resonant frequencies. Experimental variation of the difference frequencies $F_m$ and $F_t$ with the angle is less than 400 Hz which gives a very small torque measurement error, typically below 0.2% of the sensor full scale. The RF rotary coupler 310 works well for a large range of gaps or distances between the rotor and the stator rings. If 50Ω planar microstrips are used as coupled transmission lines on the stator and the rotor rings with a PCB thickness of 1.6 mm, then the distance between the rotor and the stator microstrips may vary from 1 mm to 4 mm, thereby loosening the tolerance for the distance between a cylinder block and the flexplate.

Figure 15:
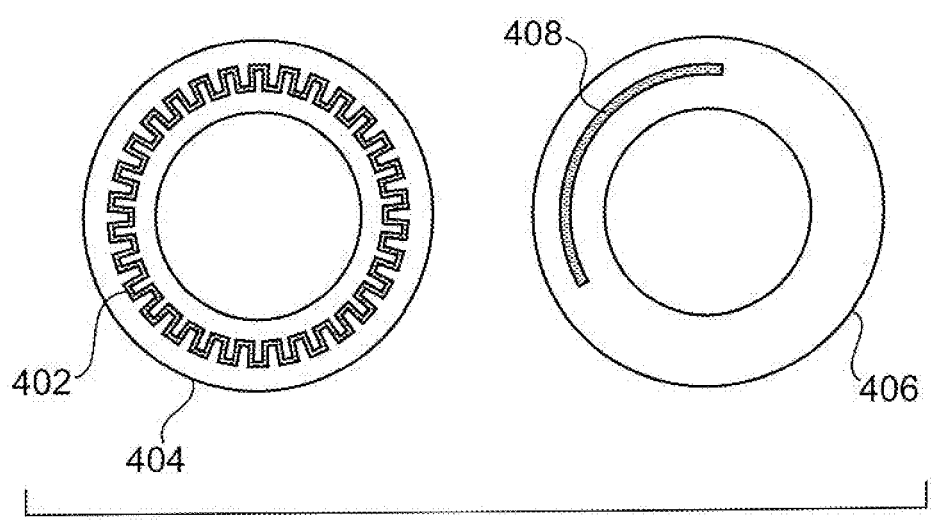
FIGS. 15-17 are diagrams illustrating alternative configurations of stator and rotor microstrips employed in exemplary rotor coupler systems in accordance with aspects of the present principles.
Figure 16:
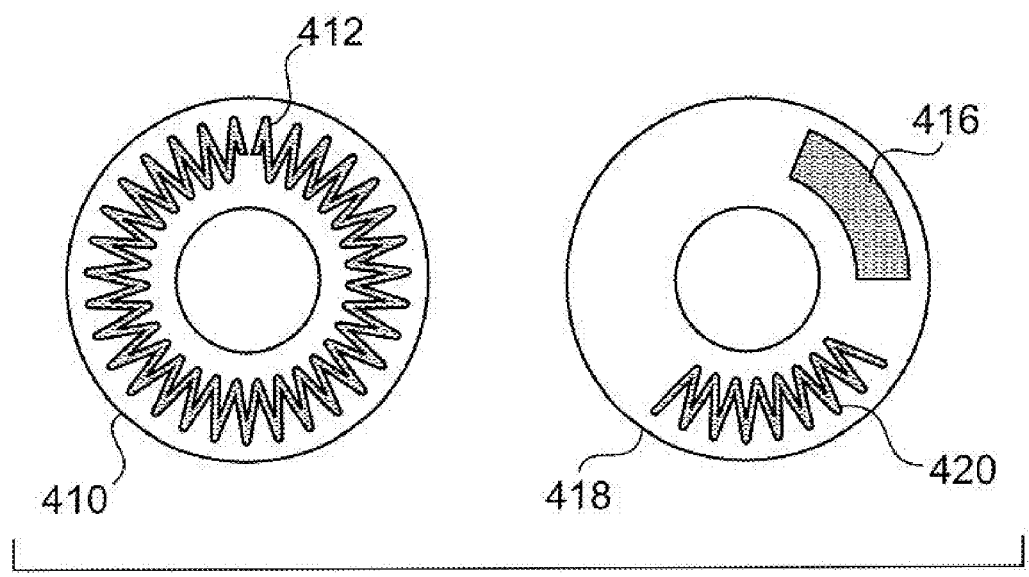
Figure 17:
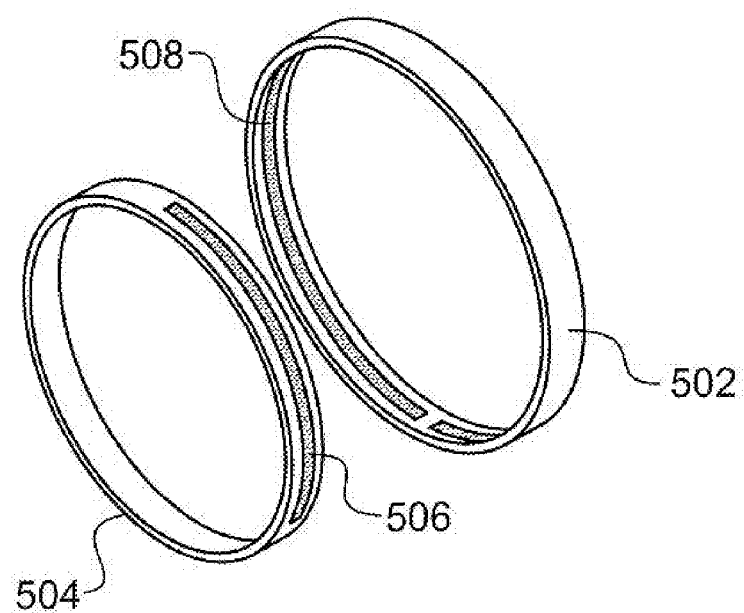

With reference to FIGS. 15-17, other possible configurations of the microstrips may be applied in various implementations of the present principles. For example, as shown in FIGS. 15 and 16, the stator microstrips 402, 412 of stator couplers 404, 410 undulate about respective radii that are concentric with the annular shape of the microstrips. Here, the stator microstrips may undulate about the average radius of the annular shape such that the length of the stator microstrip varies in multiples of $\lambda$. Varying the length of the stator microstrip while maintaining the average radius of the annular shape of the microstrip permits conformity with the constraints of different mechanical designs. Similarly, the rotor microstrip may also undulate about an average radius of the annular shape of the microstrip, as illustrated by rotor microstrip 420 of rotor coupler 418 paired with stator coupler 410. Alternatively, the microstrip 416 may have a width corresponding to the width between maxima of the undulating stator microstrip 412. The rotor microstrips 420, 416 may have an overall length of $\lambda/4$ or less. In addition, a rotor microstrip 408 with a smooth arc of rotor coupler 406 and a length of $\lambda/4$ or less may be used with an undulating stator microstrip. FIG. 17 illustrates a coaxial cylindrical microstrip design that may be employed in implementations of the present principles, including a rotor microstrip 506 with a length of $\lambda/4$ or less, a rotor coupler 504, a stator microstrip 508 with a length of $\lambda$ or an integer multiple of $\lambda$, and a stator coupler 502.

In accordance with aspects of the present principles, the electronic SAW interrogation unit may perform contactless measurement of the SAW resonant frequencies for determination or computation of torque, as discussed above, by using a number of different methods. One type of method relies on measurement of the frequency response of the SAW resonator $S_{11}(f)$, or its impedance $Z(f)$, through the RF rotary coupler and determining the resonant frequency as the frequency where the minimum of the reflection coefficient $|S_{11}|$ is achieved or the amplitude and the phase of the reflected signal display transition through minimum and zero, respectively. A continuous wave (CW) interrogation signal having a variable frequency permitting either a sequential search for the resonance or continuous tracking of the SAW resonant frequency varying with time may also be used. Sequential search of the resonance often involves the use of an expensive high precision frequency synthesiser, such as a Direct Digital Synthesis (DDS) synthesiser, with a small frequency step that is relatively slow. Continuous tracking is generally faster and less demanding with respect to the interrogation signal source but the electronic circuit may be cumbersome if more than two SAW resonators are interrogated. Both or either a sequential search and continuous tracking may be performed by the SIU to determine the resonant frequencies of SAW resonators and compute the torque, as discussed above.

Figure 18:
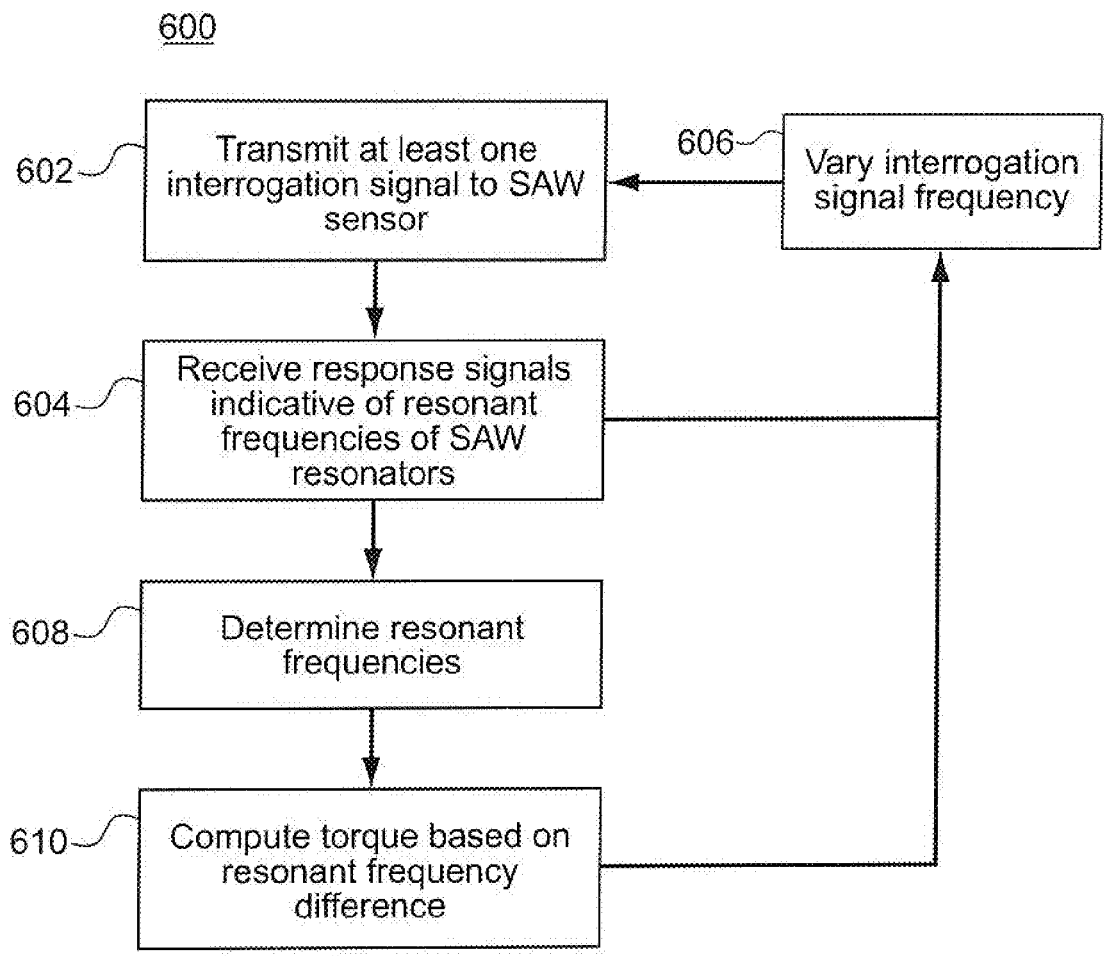
FIG. 18 is a high level block/flow diagram illustrating a method for measuring the torque generated by an engine in a powertrain of an automobile in accordance with an exemplary embodiment of the present invention.

With reference to FIG. 18, a method 600 for measuring torque generated by an engine in a powertrain in accordance with an exemplary embodiment of the present invention is illustrated. The method may begin at step 602 by transmitting interrogation signals to a rotor coupler that are configured to activate and power a SAW sensor, as discussed above. In turn, response signals from which resonant frequency differences of SAW resonators are determined may be received at step 604. The interrogation signals and the response signals transmitted and received in steps 602 and 604 may be transmitted as part of a search, in which the frequency of a continuous wave interrogation signal is varied sequentially until all resonant frequencies of the SAW resonators are determined. Thus, the frequency may be varied at step 606 to perform a sequential search by sweeping through available frequencies. At step 608, the resonant frequencies may be determined based on received signals by calculating the frequency corresponding to a minimum of a reflection coefficient of a received signal or by calculating the frequency corresponding to an amplitude and phase of a response signal that respectively transition through minimum and zero, as discussed above. The frequency may be varied again at step 606 to detect other resonant frequencies if the search phase is not complete. If the search phase is complete and all resonant frequencies are found, the torque may be computed at step 610 by determining the difference, $F_m$, between resonant frequencies of at least two SAW resonators, as discussed above. Thereafter, the frequency may be varied at step 606 and the resonant frequency determination and torque calculation may be repeated to continuously track and monitor the generated torque.

Figure 19A:
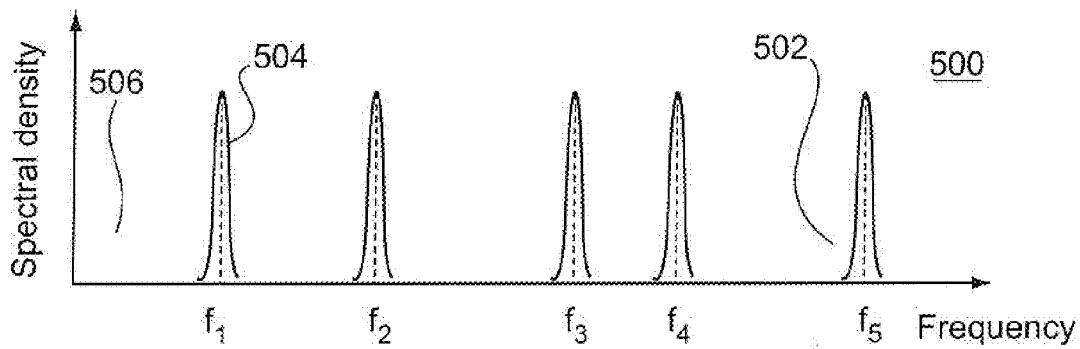
FIG. 19a is a plot illustrating the simultaneous excitation of SAW sensors using a wide-band impulse interrogation signal for determination of a torque applied through a flexplate.

Another type of interrogation method includes time domain methods relying on measurement of the impulse or transition characteristics of the SAW resonator. The impulse response of a circuit is a response to an impulse function $\delta(t)$, which is theoretically infinitely short in time and has a unity area. The impulse response of the resonator is an exponentially decaying sine wave with the frequency of its natural oscillation very close to the series resonant frequency of the SAW resonator. By exciting the resonator by the impulse, the resonant frequency of the resonator may be measured as the frequency of its natural oscillations. With reference to FIGS. 19a and 19c, a theoretical impulse has an infinitely broad spectral density 502 so that it can excite not just a single resonator 504 but a group of three or five resonators simultaneously as shown in plot 500, wherein five resonators have resonant frequencies of $f_1$-$f_5$, respectively. As a result, a simultaneous measurement of all three or five resonant frequencies is possible. However, the impulse $\delta(t)$ is a mathematical abstraction. In practice, as illustrated in plot 520 (FIG. 19c), the impulse response 524 is obtained by applying a very short baseband or video pulse 522 such that its spectrum is much wider than the bandwidth of the circuit under consideration. As a result, the spectral density of a practically realizable impulse 506 will gradually decrease with frequency but it can still simultaneously excite all the resonators in one or two SAW sensing elements, as shown in plot 500. Here, using an impulse as an interrogation signal has an advantage in that all SAW resonators may be excited or activated with a single impulse. However, an important disadvantage of using an interrogation signal with such a wide bandwidth is that there is a significantly inefficient utilization of its energy. Furthermore, the energy available at any specific frequency is low. Only a very small portion of the energy spectrum of the impulse will overlap with the frequency responses of the resonators that the impulse excites. The rest of its energy would be lost in vain. Thus, for a practically achievable impulse amplitude, the SAW response will be very small and the response frequencies may not be a reliable measure.

Figure 19B:
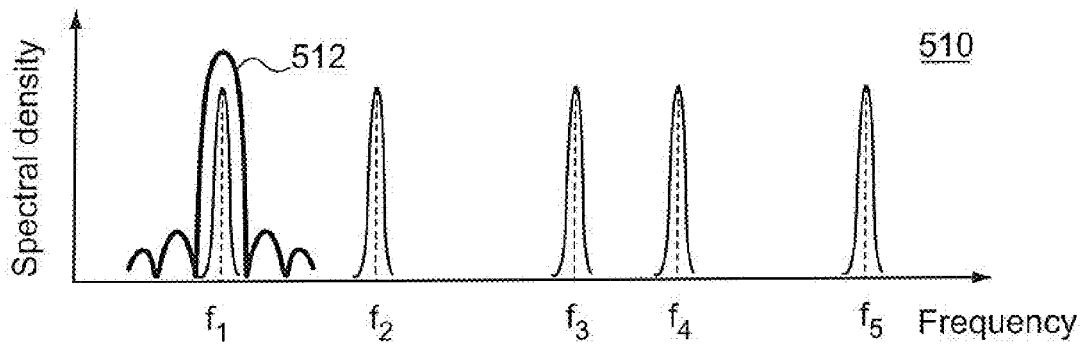
FIG. 19b is a plot illustrating application of interrogation signals having bandwidths that match bandwidths of SAW resonators mounted on a flex plate.
Figure 19C:
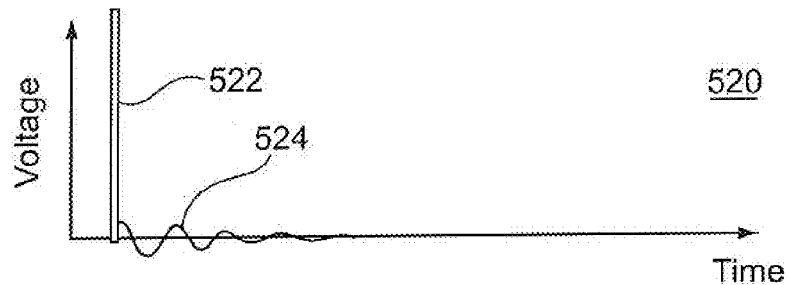
FIG. 19c is a plot illustrating an impulse interrogation signal and a corresponding SAW resonator response.
Figure 19D:
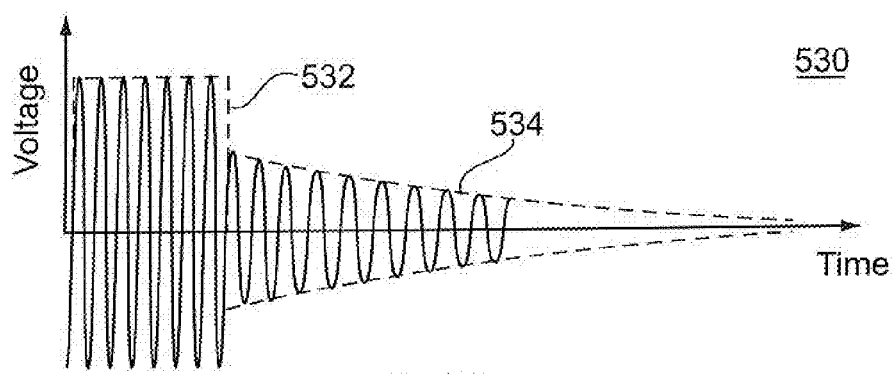
FIG. 19d is a plot illustrating an RF pulse interrogation signal and a corresponding SAW resonator response employed to determine the torque applied through a flex plate.
Figure 21:
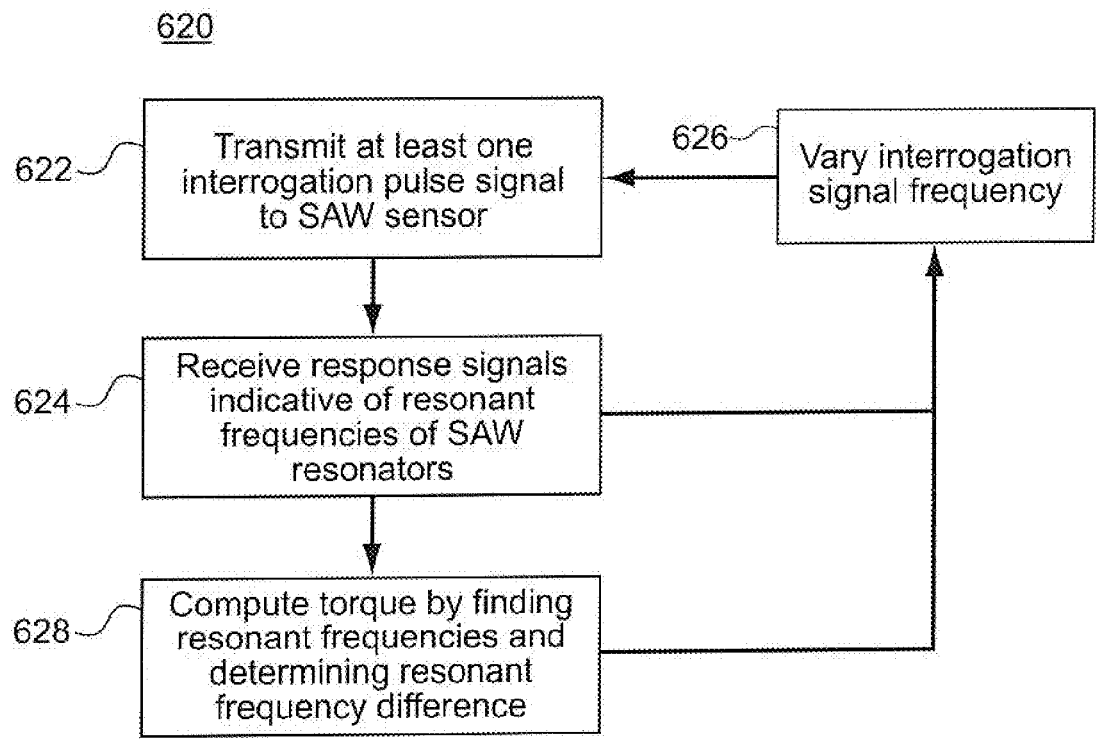
FIG. 21 is a high level block/flow diagram illustrating a method for measuring the torque generated by an engine in a powertrain of an automobile in accordance with an alternative exemplary embodiment of the present invention utilizing interrogation pulse signals.

With reference to FIGS. 19d and 21, a more practical time domain method of excitation of the natural oscillations in the SAW resonator includes utilizing an interrogation signal in the form of an RF pulse 532 with a carrier frequency that is close to the resonant frequency of one of the resonators having a rectangular or any other suitable envelope, as shown in plot 530. The interrogation pulses may be employed in a method 620 for measuring a torque generated by an engine in a powertrain of an automobile in accordance with an exemplary embodiment of the present invention. An interrogation RF pulse generated by the SIU may be applied to the SAW sensing elements through the RF rotary coupler at step 622. The natural oscillations 534 of the resonator with the resonant frequency close to the interrogation frequency may be transmitted from the sensing elements back to the SIU through the coupler again in the form of response signals received at step 624.

Referring now to FIG. 19b and with continuing reference to FIG. 21, the length of the interrogation signal may be configured such that the width of its spectrum 512 approximately matches the bandwidth of each SAW resonator to achieve efficient excitation of the resonators, each having resonant frequencies $f_1$-$f_5$, respectively, as shown in plot 510. Interrogation pulse signals that match the bandwidth of each resonator may be used to perform sequential measurement of one resonant frequency after another. To perform sequential measurement, the carrier frequency of interrogation pulse signals may be varied at step 626. During sequential measurement, the carrier frequency of the interrogation RF pulse may vary in step 626 from one interrogation frequency selected from a discrete set of frequencies to another one, then to the third one, etc., depending on the number of resonators in the system. All the interrogation frequencies should be as close to their respective SAW resonant frequencies as possible. However, it should be noted that the carrier frequencies of the interrogation signals may respectively deviate from the resonant frequencies of the resonators by approximately the width 512 of the respective pulse spectrum. After completing interrogation of all resonators, the interrogation frequency may return to the first interrogation frequency closest to the previously measured first resonant frequency and the measurement cycle continues.

The optimum interrogation frequencies may be selected for the first time when the sensor is switched on by applying a search phase. For example, during the search phase, at the beginning of measurements, the carrier frequency of the interrogation pulse may be sequentially swept through all possible interrogation frequencies by varying the frequency at step 626 and the three/five optimum interrogation frequencies may be found as a result. After the resonators are found during the search, a normal, cyclical measurement phase may begin, during which the carrier frequency of groups of coherent pulses is sequentially changed from one optimum interrogation frequency to another one for all three/five resonators, as described above.

Figure 20:
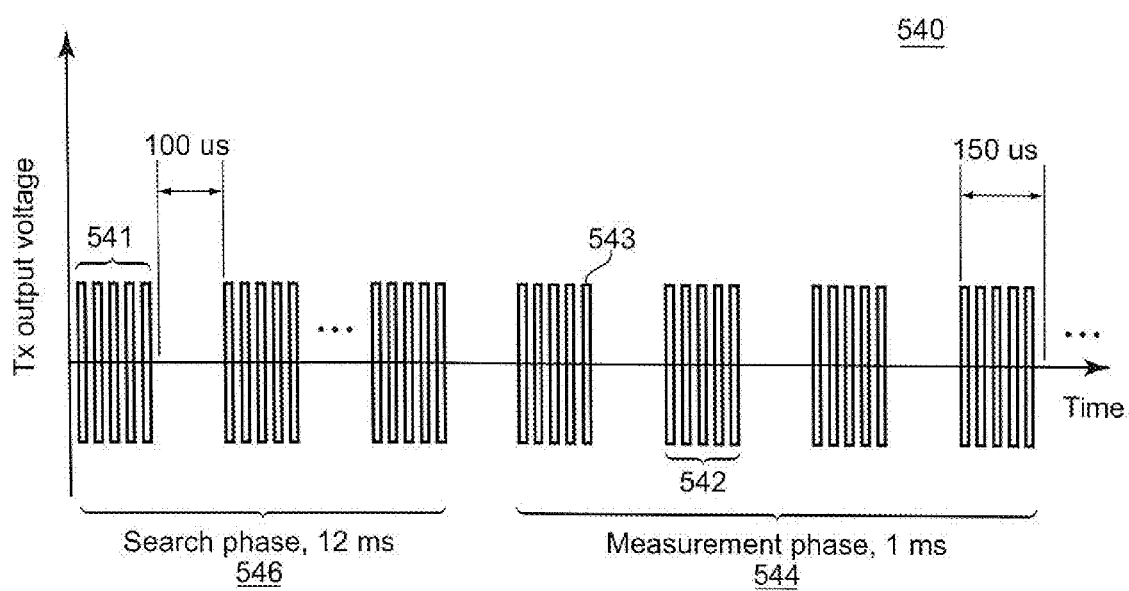
FIG. 20 is a plot illustrating search and measurement phases of interrogation signal transmissions employed to determine resonant frequencies of SAW resonators for computation of the torque transmitted through a flexplate.

At step 628, the torque may be computed by analyzing a spectrum of response signals to find the resonant frequencies and by determining the difference, $F_m$, between the resonant frequencies, as discussed above. To find the resonant frequencies, the SAW response may be converted to electrical signals by the transducers on the SAW sensors that are transmitted via RF signals between a rotor coupler and a stator coupler. The SAW response, which is in the form of an exponentially decaying oscillation, may thereafter be received by the SIU's receiver (Rx), amplified, filtered and down-converted to the intermediate frequency, e.g. 1 MHz. The response may then be sampled and processed in a digital signal processor (DSP) to calculate the frequency of the natural oscillation. Random errors in the measured resonant frequencies caused by additive receiver circuit noise and the phase noise of a local oscillator can be reduced by means of coherent accumulation of several SAW resonant responses in the DSP memory. This may be achieved by using a common clock frequency source both for the local oscillator synthesiser and for the DSP. The sequence of the interrogation pulses generated by the SIU, in the case of five coherently accumulated SAW responses, and approximate timing are shown in plot 540 of FIG. 20. Each group of five transmitted interrogation RF pulses 542 has the same carrier frequency corresponding to one of the resonant frequencies, e.g. $f_1$-$f_5$, and is transmitted during the measurement phase 544. In effect, each pulse 543 within a group of pulses 542 is a burst of sinusoidal oscillations for example corresponding to 532 in FIG. 19d. A SAW signal received in response to each interrogation pulse is sampled at strictly defined moments of time so that all signals corresponding to a group 542 can be added in-phase in the DSP memory. At the search phase 546, carrier frequencies of the groups of pulses sweep through all possible interrogation frequencies to find all of the SAW resonators. At the measurement phase, each group of five interrogation pulses 548 has an interrogation frequency close to one of four resonators measuring torque, for example, if two sensing elements are used. The fifth resonator measuring temperature may be interrogated much less frequently, as temperature tends to vary much more slowly than torque.

The resonant frequency of each SAW resonator may be calculated based on Fourier analysis of the in-phase and quadrature components of the down-converted SAW response, I(t) and Q(t), respectively, shifted relative to each other in phase by 90° at the DSP input. A separate calculation of two frequencies corresponding to the maxima of the power spectral density of I and Q may be determined and averaged in order to cancel the influence of the unknown initial phase angle of the SAW response on the measurement result. Additionally, a slightly different approach may be employed Instead of the separate Fourier analysis of I(t) and Q(t), Fourier analysis of the complex signal I(t)+jQ(t) may be performed and the frequency of the maximum of its power spectral density may be found. The result is practically the same except that the calculations may be computed faster. The n-th spectral line $S_n$ is calculated in this case on the basis of N samples $I_k$ and $Q_k$ of the signals I(t) and Q(t) as shown below:

$$S_n = \left[\sum_{k=0}^{N-1} (I_k \cos\varphi_{kn} + Q_k \sin\varphi_{kn})\right]^2 + \left[\sum_{k=0}^{N-1} (Q_k \cos\varphi_{kn} - I_k \sin\varphi_{kn})\right]^2$$

where $$\varphi_{kn} = 2\pi \frac{kn}{N}.$$

Then, after finding the m-th line at the frequency $f_m$ having maximum value $S_m$, the resonant frequency $f_r$ is calculated by means of finding the maximum of the curve interpolating neighbouring spectral lines. If parabolic interpolation is used then the resonant frequency is found according to the formula:

$$f_r = f_m + 0.5 \Delta f_{line} \frac{S_{m+1} - S_{m-1}}{2S_m - S_{m-1} - S_{m+1}}$$

where $\Delta f_{line}$ is the distance between the spectral lines.

Further, averaging of the calculated resonant frequencies on the basis of several repeated measurement cycles may be applied to reduce standard deviation of the measured frequencies and, hence, enhance resolution of the sensor. Quite often, though, the torque signal measured by the flexplate sensor varies with time so rapidly that averaging does not help reduce the standard deviation. However, averaging does permit further suppression of oscillations of the measured average torque signal due to bending and vibrations.

Figure 4:
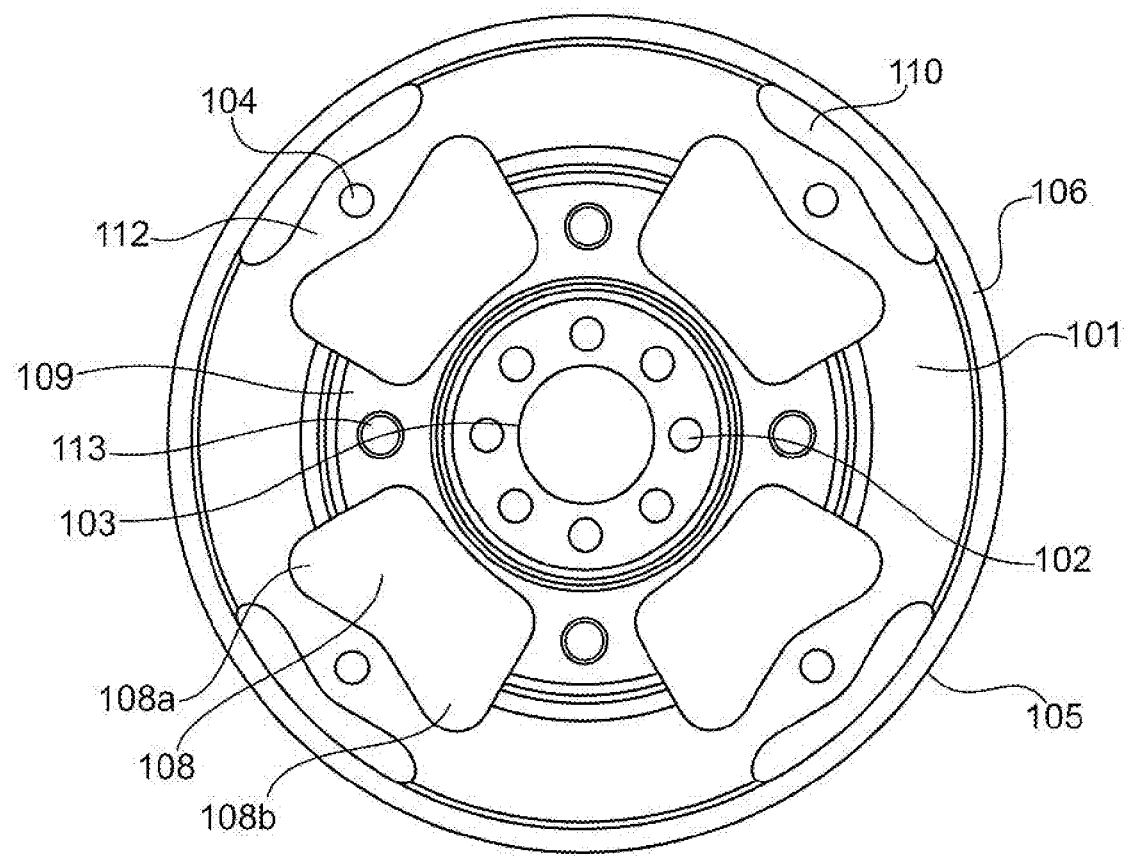
FIG. 4 is a front view of a first flexplate configuration embodying the invention.

With reference now to FIG. 4, there is shown a flexplate 101 which forms part of a drive coupling assembly. The flexplate 101 is an annular member having a first plurality of fastening holes 102, distributed around a first inner radius proximate to the inner circumferential edge 103 of the plate, for drivingly coupling the flexplate 101 to a flange coupling on an end of the crankshaft (not shown). A second set of four fastening holes 104 is distributed around a second radius proximate to the outer circumferential edge 105 of die flexplate 101, and a starter ring gear 106 is formed on the outer circumferential edge 105 of the flexplate 101, with which, in use, a gear of a starter motor (not shown) meshes for rotating the crank shaft.

The flexplate 101 further includes a plurality of through apertures 108—in the illustrated embodiment four—which are equi-angularly distributed around the flexplate on a common radius intermediate the first and second radii, and which are separated by four radially extending webs 109. Each aperture 108 has reflectional symmetry about a centre line which extends along a radius of the flexplate 101 and is butterfly shaped with a wing 108a, 108b extending on either side of the centre line. Each of the second set of four fastening holes 104 is associated with one of the apertures 108, lying on the radius of the flexplate 101 extending along the centre line of the associated aperture 108. A circumferentially extending through slot 110 is formed in the flexplate 101 radially outward of each aperture 108 and its associated second fastening hole 104, each slot 110 extending symmetrically on either side of the radius which extends through the centre line of the associated aperture 108 such that the fastening hole 104 is formed carried on decoupling flexure 112.

A countersunk spotface 113 is formed in at least one of the webs 109 (in the illustrated embodiment in all four of the webs 109) on the centre line thereof proximate to the inner radial edge of the flexplate 101 on which is mounted a SAW sensor which measures the strain in the web from which the torque transmitted through the flexplate 101 can be calculated. The or each spotface 113 extends substantially (half way) through the thickness of the web so that the SAW sensor lies in the plane of the neutral axis of the flexplate. The actual position of the neutral axis may be determined by simulating the application of bending stresses to the flexplate (including spotface), using finite element analysis.

Figure 5:
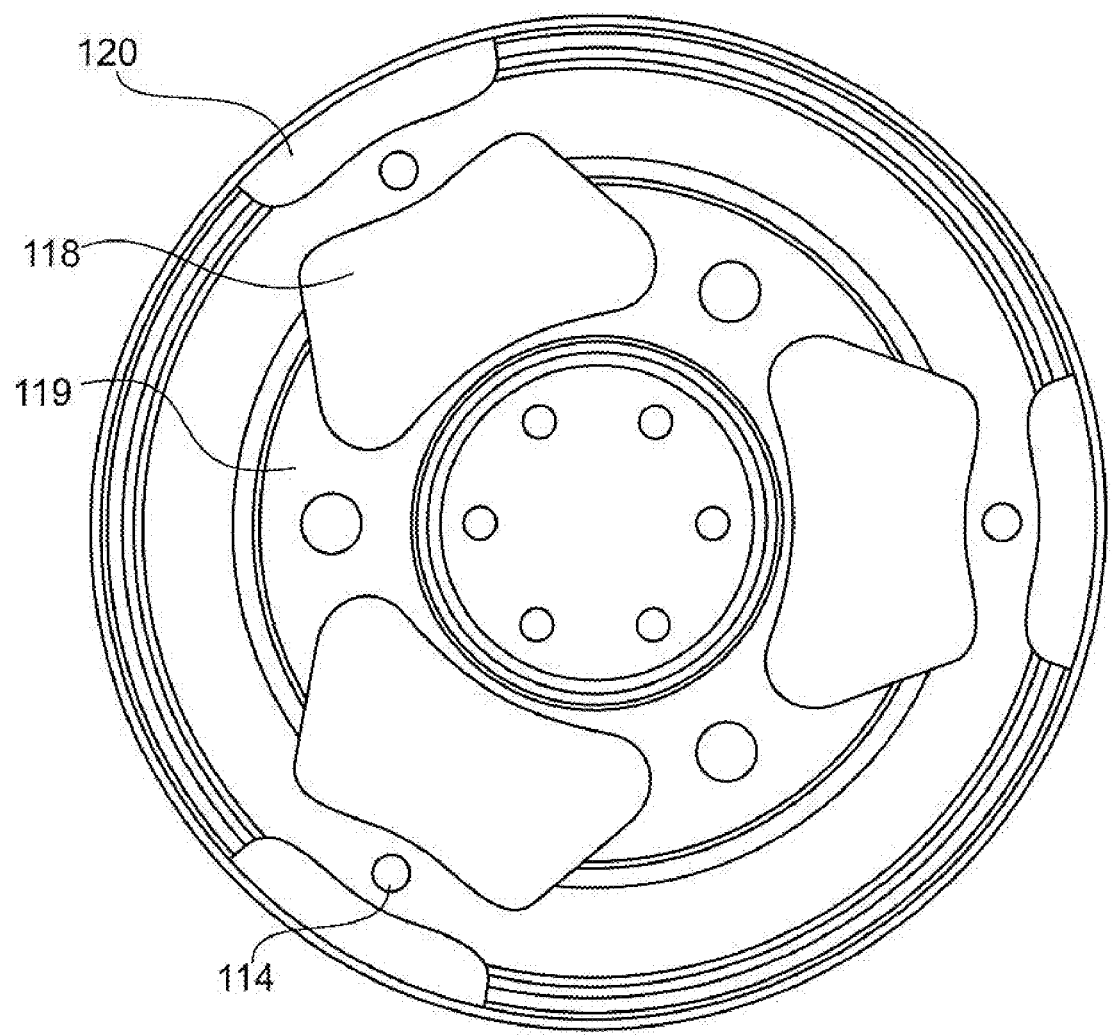
FIG. 5 is a front view of a second flexplate configuration embodying the invention.

FIG. 5 illustrates a second flexplate design which is similar to the first except that only three apertures 118 are provided which form three radial webs 119, three slots 120 and three outer fastening holes 114 being provided, one associated with each aperture 118. Accordingly, the flexplate of second embodiment has three-way rotational symmetry as compared with the four way rotational symmetry of the first embodiment.

Although the circumferential slots 110, 120 provide advantageous improvements to the measuring accuracy of the sensor, their presence is not critical to operation of the invention and significant improvements over conventional systems is still achieved if they are not present.

Figure 6:
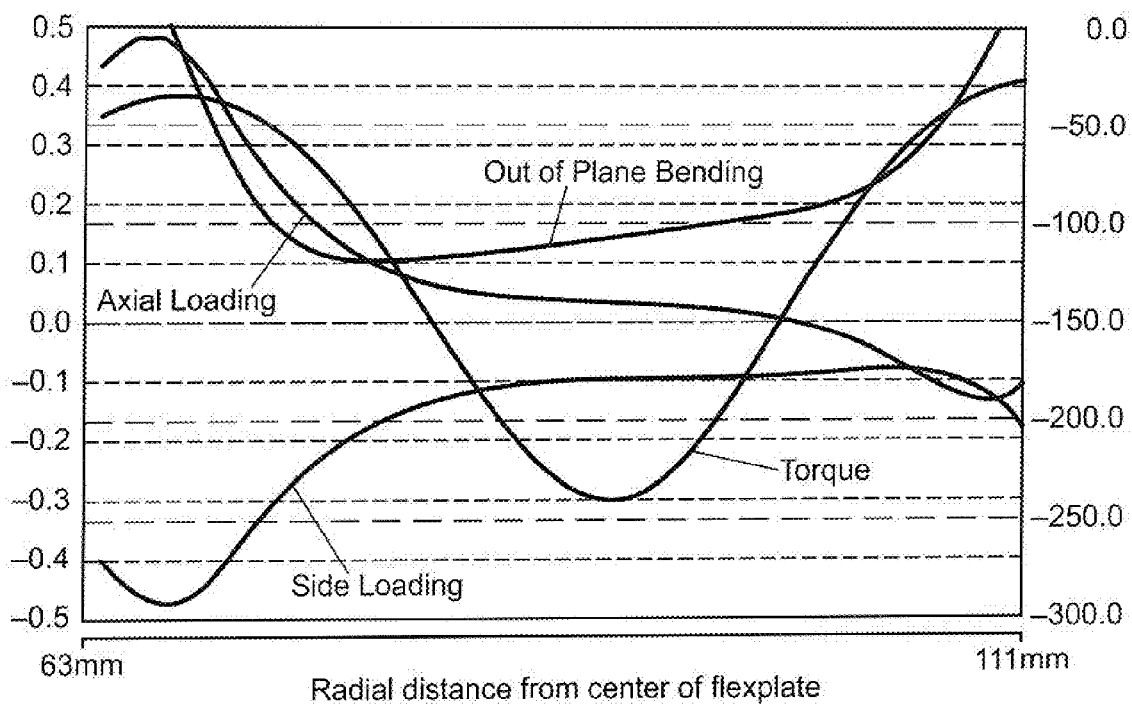
FIG. 6 is a graph showing results of a finite element analysis for a conventional flexplate.
Figure 7:
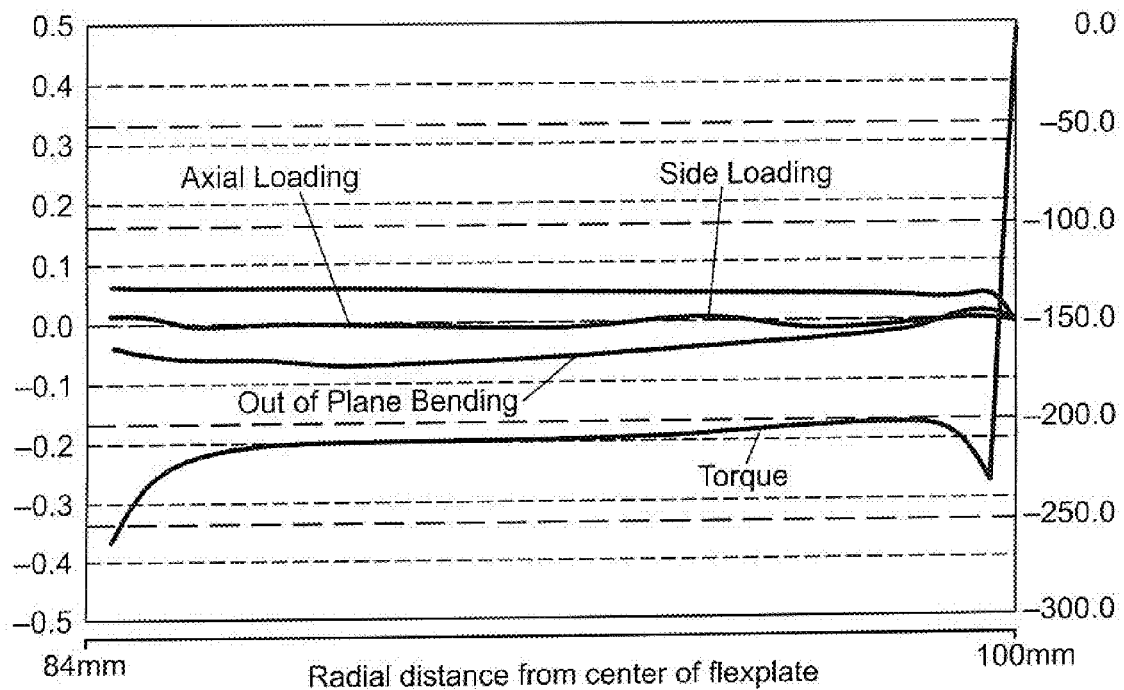
FIG. 7 is a graph showing results of corresponding finite element analysis for a flexplate according to the invention.

FIGS. 6 and 7 illustrate graphically the improvements in measurement sensitivity and accuracy afforded by the present invention. FIG. 6 shows results of a finite element analysis for a conventional flexplate, illustrating the distribution of shear strain (right hand axis) due to engine "Torque" along a radial line between 63 mm and 111 mm from the flexplate centre and the distribution of "unwanted shear strains due to axial and side loading and out-of-plane moments" (left hand axis) along the same radial line, but expressed as a decimal fraction of the "wanted shear strain due to engine Torque".

In comparison, FIG. 7 shows results of corresponding analysis for a flexplate according to the invention, illustrating the distribution of shear strain (right hand axis) due to engine "Torque" along a radial line between 84 mm and 100 mm from the flexplate centre, and the distribution of "unwanted shear strains due to axial and side loading and out of plane moments" (left hand axis) along the same radial line, again expressed as a decimal fraction of the "wanted shear strain due to Torque".

As can be seen from a comparison of these two graphs, the system of the invention greatly reduces the ratio of unwanted to wanted shear strain, and also affords the additional benefit of providing a much flatter region of both wanted and unwanted shear strain, making the placement of the sensor less critical compared with conventional systems.

What is claimed is:

1. A system for measuring the torque generated by an engine in a powertrain of an automobile comprising:
    a crankshaft driven by the engine and configured to apply the torque to a disc coupling component;
    the disc coupling component configured to transmit the torque to a torque converter within said powertrain for driving the wheels of the automobile; and
    a surface acoustic wave (SAW) sensor including at least two SAW active elements through which SAWs propagate with phase velocity directions that are respectively aligned with principal strains due to torque in the disc coupling component either at rest or during rotation such that the difference ($F_m$) between respective resonant frequencies is indicative of the torque (M) generated by the engine.

2. The system according to claim 1, wherein the SAW sensor is mounted to said disc coupling component in a position in which the principal strains in the disc coupling component due to torque are orthogonal at +/−45 degrees to the circumferential or radial directions, equal in magnitude and opposite in sign.

3. The system according to claim 1, wherein the SAW active elements are first and second SAW resonators.

4. The system according to claim 3, wherein resonant peaks corresponding to the resonant frequencies of the SAW resonators do not cross each other at any value of applied principal strain due to torque and temperature.

5. The system according to claim 4, where the applied principal strain ranges from −250 to +250 microstrain and the temperature ranges from −40° C. to +160° C.

6. The system according to claim 4, where the applied principal strain ranges from −500 to +500 microstrain and the temperature ranges from −50° C. to +200° C.

7. The system according to claim 3, wherein the SAW sensor includes a quartz substrate having a crystallographic X-axis that coincides with a radial direction of the disc coupling component or that is normal to said radial direction.

8. The system according to claim 7, wherein SAW propagation directions in the SAW resonators are each oriented at forty-five degrees to the crystallographic X-axis and orthogonal to each other.

9. The system according to claim 7, wherein the SAW sensor is oriented on the disc coupling component and configured such that the sensitivity of $dF_m/dM$ to temperature variation of third-order elastic constants of the substrate is at least partially cancelled by the sensitivity of $dF_m/dM$ to the net effect of a linear temperature coefficient of expansion of the substrate, non-zero third-order elastic constants of the substrate, temperature variation of the first-order elastic constants of the substrate and temperature variation of the density of the substrate of the SAW sensor.

10. The system according to claim 9, wherein the substrate is cut at or between Y+30° and Y+38° to reduce the sensitivity of the SAW sensor to temperature variation and to common-mode interference factors.

11. The system according to claim 9, wherein the phase velocity directions of the SAWs are each oriented at or between forty-four degrees and forty-six degrees to the crystallographic X-axis.

12. The system according to claim 9, wherein the phase velocity directions of the SAWs are each oriented at forty-five degrees to the crystallographic X-axis and orthogonal to each other and the substrate is cut Y+34° to reduce the sensitivity of the SAW sensor to temperature variation and to common-mode interference factors.

13. The system according to claim 3, wherein the SAW sensor further includes
a third SAW resonator attached to a substrate on which said SAW resonators are mounted, wherein the third SAW resonator is oriented to one of said first and second SAW resonators such that the difference ($F_t$) between respective resonant frequencies of the third SAW resonator and one of said first and second SAW resonators is optimized for temperature measurement of the disc coupling component.

14. The system according to claim 13, wherein the substrate has a crystallographic X-axis that is aligned with a radial direction of the disc coupling component or that is normal to said radial direction and wherein the phase velocity direction of a SAW propagating through the third SAW resonator is at or between 0° and 30° relative to the crystallographic X-axis.

15. The system according to claim 14, wherein the substrate is cut Y+34° to reduce the sensitivity of the SAW sensor to temperature variation.

16. The system according to claim 13, wherein each resonator is electrically connected to every other resonator.

17. The system according to claim 13, wherein the third SAW resonator is comprised of aluminium film and wherein the ratio of aluminium film thickness to the third SAW resonator's SAW wavelength is at or between 0.021 and 0.032.

18. The system according to claim 17, wherein the aluminium film thickness is at or between 160 nm and 240 nm and the resonant frequency of SAWs propagating through the third SAW resonator is at or between 428 MHz and 437 MHz.

19. The system according to claim 13 further comprising:
an additional SAW sensor including additional resonators that is positioned diametrically opposite relative to the SAW sensor on the same face of the disc coupling component such that differential mode interference with resonant frequencies is suppressed in an average of $F_m$ and in a difference between resonant frequencies of the additional resonators during rotation of the disc coupling component.

20. The system according to claim 1, wherein the disc coupling component is selected from the group consisting of a flexplate and a flanged coupling.

21. A system for measuring a torque generated by an engine in a powertrain of an automobile comprising:
a crankshaft driven by the engine and configured to apply the torque to a disc coupling component;
the disc coupling component configured to transmit the torque to a torque converter within said powertrain for driving the wheels of the automobile;
a surface acoustic wave (SAW) sensor mounted on the disc coupling component, the SAW sensor including at least two SAW active elements through which SAWs propagate with phase delays that are indicative of the torque generated by the engine;
a rotary coupler comprising a rotor coupler and a stator coupler,
the rotor coupler including a rotor transmission line having an annular shape, wherein the rotor coupler is mounted on the disc coupling component and is coupled to the SAW sensor such that the rotor transmission line receives signals generated from the SAWs and converts the signals to electromagnetic waves during rotation of the disc coupling component; and
the stator coupler including a stator transmission line having an annular shape and a length that is greater than the length of the rotor transmission line, the stator transmission line configured to receive the electromagnetic waves for processing and determination of the torque generated by the engine.

22. The system according to claim 21, wherein the length of the rotor transmission line is approximately equal to $0.25\lambda$, wherein $\lambda$ is the wavelength at the SAW operating frequency in the rotor transmission line and where one end of the rotor transmission line is connected to the SAW sensor and the opposite end of the rotor transmission line is short-circuited.

23. The system according to claim 22, wherein the length of the stator transmission line is approximately an integer multiple of $\lambda$ and where one end of the stator transmission line is used as a port for transmission of the electromagnetic waves for processing and determination of the torque generated by the engine and the opposite end of the stator transmission line is loaded with a matched load.

24. The system according to claim 23, wherein the stator transmission line undulates about a radius concentric with the annular shape of the stator transmission line.

25. The system according to claim 23, wherein the rotor transmission line is concentric with the disc coupling component.

26. The system to according to claim 23, wherein the at least two SAW active elements are activated and powered by interrogation signals transmitted from the stator coupler.

27. The system according to claim 26, wherein the insertion loss of the couplers does not exceed 15 dB.

28. The system according to claim 23, wherein the annular shapes of the stator and rotor transmission lines share the same radius.

29. The system according to claim 21, wherein the stator and rotor transmission lines are stator and rotor microstrips, respectively.

30. The system according to claim 21, wherein the disc coupling component is selected from the group consisting of a flexplate and a flanged coupling.

31. A method for measuring a torque generated by an engine in a powertrain of an automobile:
transmitting at least one radio frequency (RF) interrogation pulse signal from a SAW interrogation unit (SIU) though a stator coupler to a rotor coupler mounted on a disc coupling component configured to transmit torque from a crankshaft driven by the engine to a torque converter within the powertrain, the at least one RF interrogation pulse signal configured to activate and power at least one surface acoustic wave (SAW) sensor mounted on the disc coupling component, wherein the SAW sensor includes at least two SAW resonators through which SAWs propagate in response to receiving the at least one interrogation pulse signal;
receiving at least one electromagnetic response signal from the rotor coupler, wherein the response signals are generated from free oscillations in the SAW resonators, transmitted to the stator coupler and correspond to resonant frequencies of the at least two SAW resonators; and
transmitting the response signal from the stator coupler to the SIU; and
computing the torque within the SIU by analyzing a spectrum of the response signals to find said resonant frequencies and by determining the difference between said resonant frequencies.

32. The method according to claim 31 further comprising the step of:
varying the frequency of the interrogation signal to perform a sequential search for the resonant frequencies.

33. The method according to claim 31, wherein each of the SAW resonators are activated by respective RF interrogation pulses.

34. The method according to claim 31, wherein said at least one RF interrogation pulse signal has a carrier frequency that is within a spectrum width of the at least one RF interrogation pulse signal from the resonant frequency of one of said SAW resonators.

35. The method according to claim 34, wherein said transmitting step further comprises sequentially transmitting interrogation pulse signals, each of which has a carrier frequency that respectively corresponds to the resonant frequency of each SAW resonator.

36. The method according to claim 35, wherein said transmitting step further comprises cyclically repeating said sequential transmission.

37. The method of claim 36, wherein at least one of said SAW resonators is a temperature SAW resonator configured to measure a temperature of the disc coupling component and wherein an interrogation pulse signal activating the temperature SAW resonator is transmitted less frequently than interrogation pulse signals activating other SAW resonators.

38. The method according to claim 36, wherein the calculating further comprises coherently accumulating a number of response signals corresponding to each SAW resonator to reduce random errors in the measured resonant frequencies caused by additive receiver circuit noise and phase noise of the receiver's local oscillator.

39. The method according to claim 38, wherein said accumulating further comprises employing a common clock frequency source for a local oscillator synthesizer and a digital signal processor within the SIU for taking samples of the received response.

40. The method according to claim 38, wherein the calculating further comprises sampling the response signals for at least one of said SAW resonators at predetermined moments in time such that the sampled signals are in phase during accumulation of the response signals.

41. The method according to claim 35, wherein widths of spectrums of each interrogation pulse signal respectively approximately match the bandwidth of each SAW resonator.

42. The method according to claim 34, further comprising:
varying the frequency of the interrogation signal to search for resonant frequencies of the SAW resonators by sweeping the interrogation pulse signals through all possible interrogation pulse frequencies.

43. The method according to claim 31, wherein the computing step further comprises calculating the resonant frequency of one of said SAW resonators by conducting Fourier analysis of in-phase and quadrature components of a corresponding down-converted response signal that are relatively shifted in phase by $\lambda/2$.

44. The method according to claim 43, wherein the computing step further comprises averaging resonant frequency values corresponding to maxima of power spectral densities of the in-phase and quadrature components.

45. The method according to claim 31, wherein the computing step further comprises calculating the resonant frequency of one of said SAW resonators by conducting Fourier analysis of a complex signal $I(t)+jQ(t)$, wherein $I(t)$ and $Q(t)$ are in-phase and quadrature components of a corresponding down-converted response signal, respectively.

46. The method according to claim 31, wherein the computing step further comprises averaging resonant frequencies over a plurality of measurement cycles to reduce the sensitivity of said difference to bending and vibrations of the disc coupling component.

47. The method according to claim 31, wherein the disc coupling component is selected from the group consisting of a flexplate and a flanged coupling.

* * * * *

UNITED STATES PATENT AND TRADEMARK OFFICE
CERTIFICATE OF CORRECTION

| | | |
|---|---|---|
| PATENT NO. | : 8,015,886 B2 | Page 1 of 1 |
| APPLICATION NO. | : 12/489575 | |
| DATED | : September 13, 2011 | |
| INVENTOR(S) | : Raymond D. Lohr et al. | |

It is certified that error appears in the above-identified patent and that said Letters Patent is hereby corrected as shown below:

On the Title pg, item (75) line 2, delete "Kallnin" and insert --Kalinin--;

On the Title pg, item (75), line 7, delete "Bicesler" and insert --Bicester--; and Column 24, line 30, following "phase by" delete "$\lambda$" and insert --$\pi$--.

Signed and Sealed this
Tenth Day of April, 2012

David J. Kappos
*Director of the United States Patent and Trademark Office*